United States Patent
Kira

(10) Patent No.: US 10,322,479 B2
(45) Date of Patent: Jun. 18, 2019

(54) TEMPORARY FASTENING TOOL

(71) Applicant: TOYOTA JIDOSHA KABUSHIKI KAISHA, Toyota-shi (JP)

(72) Inventor: Kazuhiko Kira, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 122 days.

(21) Appl. No.: 15/704,079

(22) Filed: Sep. 14, 2017

(65) Prior Publication Data
US 2018/0085871 A1 Mar. 29, 2018

(30) Foreign Application Priority Data
Sep. 26, 2016 (JP) .................... 2016-186796

(51) Int. Cl.
*B23P 19/06* (2006.01)
*B25B 13/50* (2006.01)

(52) U.S. Cl.
CPC ........ *B23P 19/069* (2013.01); *B25B 13/5008* (2013.01)

(58) Field of Classification Search
CPC ......... B23P 19/069; B25B 13/48; B25B 13/06
See application file for complete search history.

(56) References Cited

U.S. PATENT DOCUMENTS

| 9,376,266 B2 * | 6/2016 | Kira ................. B65G 47/14 |
| 9,498,859 B2 | 11/2016 | Kira et al. |
| 2010/0186556 A1 * | 7/2010 | Lin ................... B25B 13/06 |
| | | 81/125 |
| 2014/0123815 A1 | 5/2014 | Kira et al. |
| 2018/0161945 A1 * | 6/2018 | Jang ................. B23P 19/069 |

FOREIGN PATENT DOCUMENTS

| JP | 58-047476 U | 9/1981 |
| JP | 60-138649 U | 9/1985 |
| JP | 04-009273 U | 1/1992 |
| JP | 7-31272 | 6/1995 |
| JP | 11-114733 | 4/1999 |
| JP | 2006-205274 A | 8/2006 |
| JP | 2009-018402 A | 1/2009 |
| JP | 2013-871 | 1/2013 |

* cited by examiner

*Primary Examiner* — David B. Thomas
(74) *Attorney, Agent, or Firm* — Oblon, McClelland, Maier & Neustadt, L.L.P.

(57) ABSTRACT

A temporary fastening tool has a tool main body, a grip, a transmission mechanism, a socket, a plurality of pins, and two magnets. At least a portion of a side surface of the pin protrudes from an inner surface section of the socket toward a central axis of the socket. The magnets are disposed such that centers of the magnets are disposed outside of an imaginary circle having a radius of a circle that circumscribes an outer circumferential section of a screwing member that includes corner sections. The magnets are disposed at positions that do not overlap the pins when the socket is seen from a side of an opening section.

8 Claims, 32 Drawing Sheets

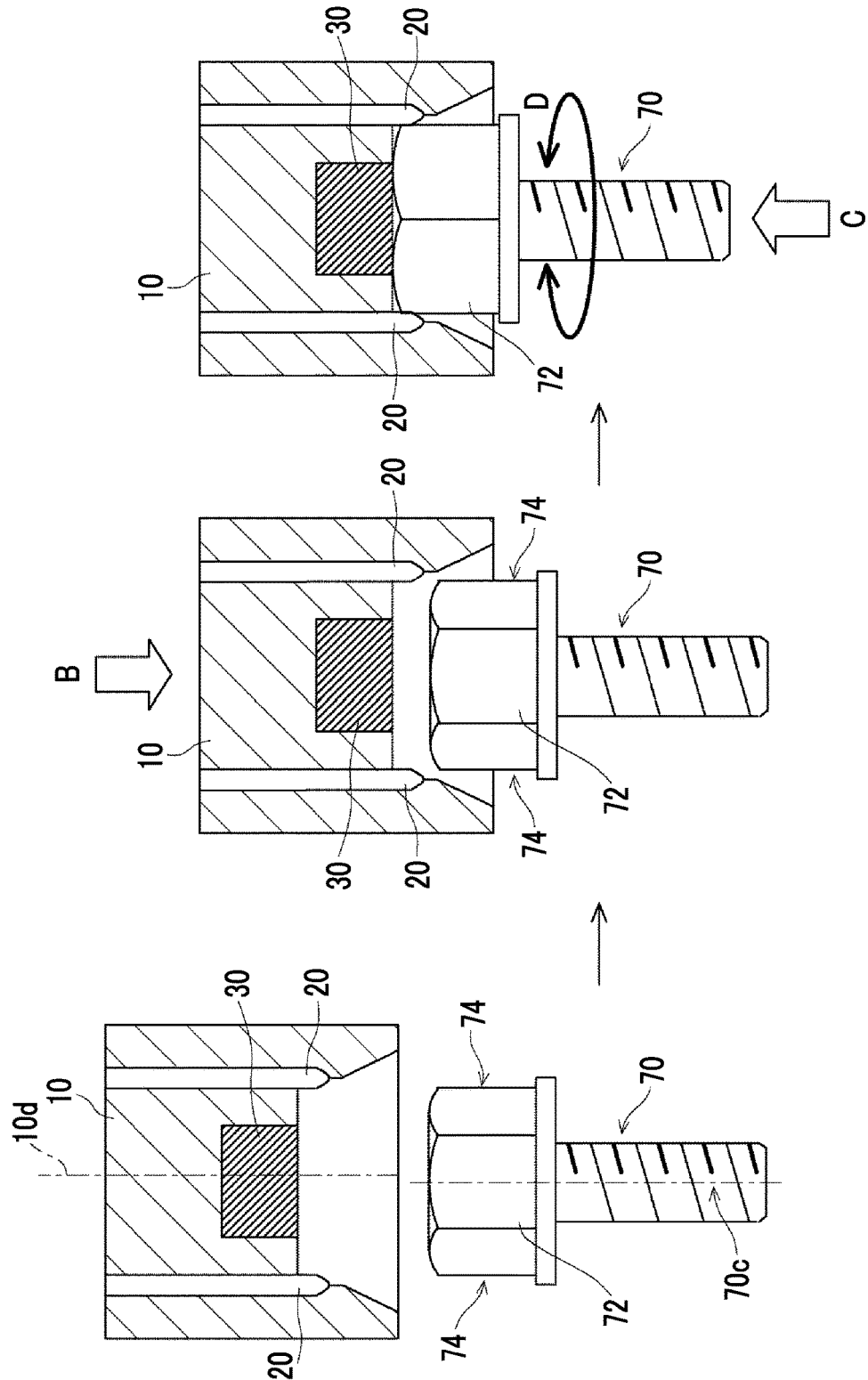

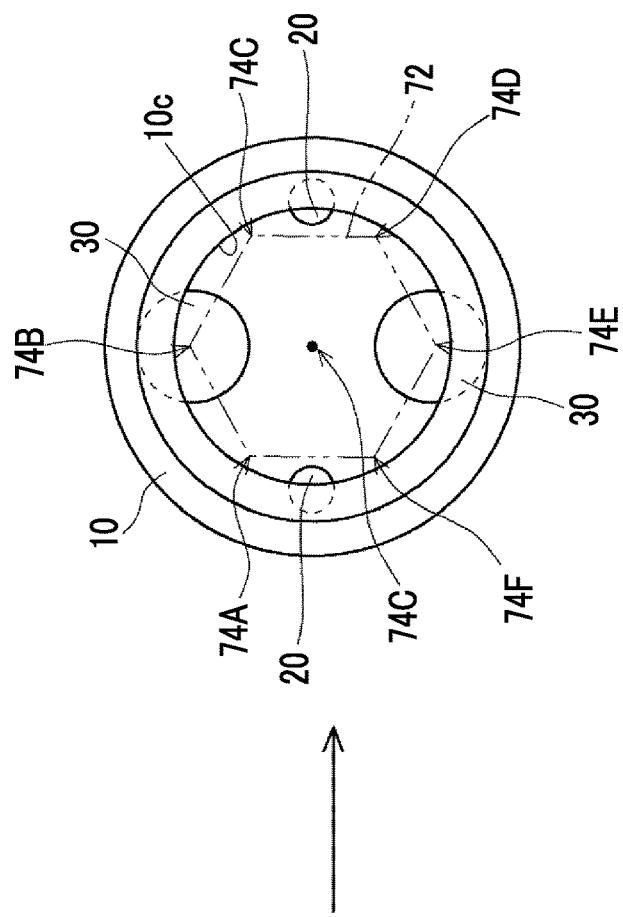
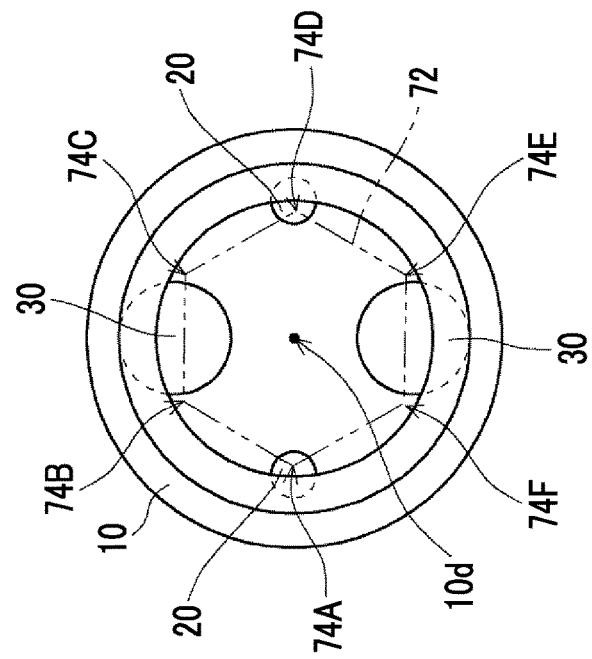
FIG. 15A
FIG. 15B

FIRST COMPARATIVE EXAMPLE

SECOND COMPARATIVE EXAMPLE

SECOND COMPARATIVE EXAMPLE

SECOND COMPARATIVE EXAMPLE

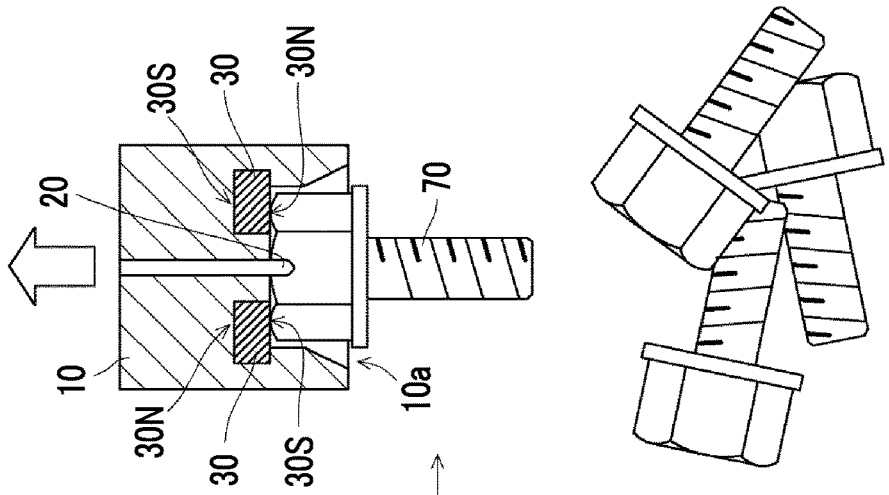
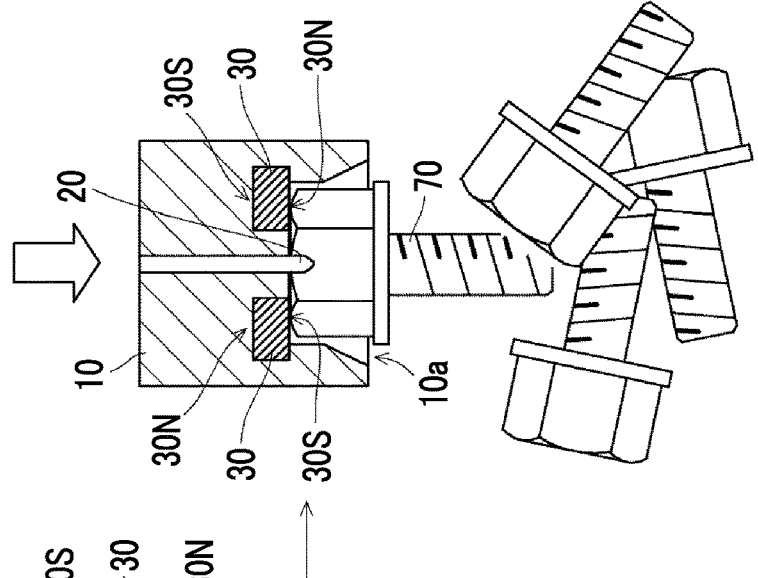
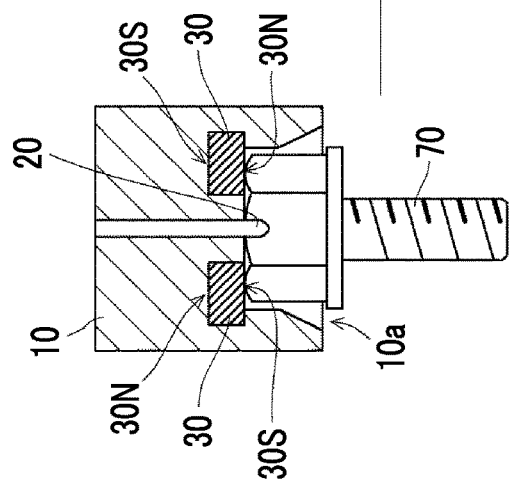

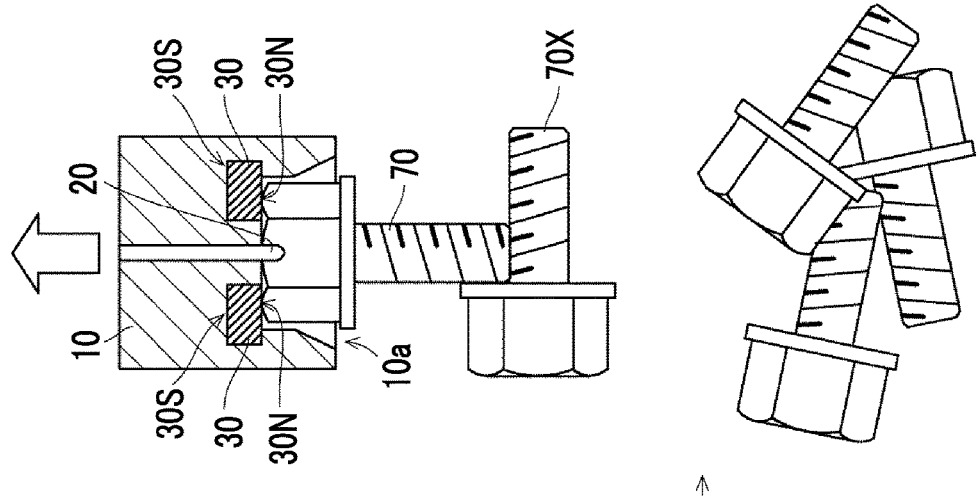
FIG. 33A   FIG. 33B   FIG. 33C
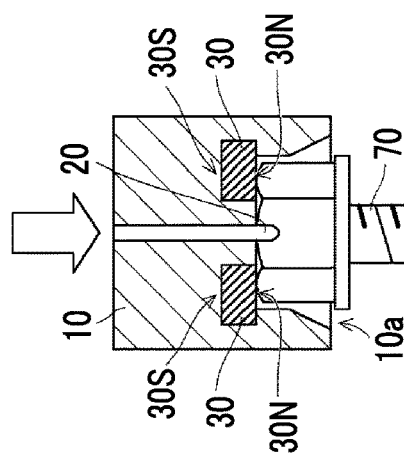
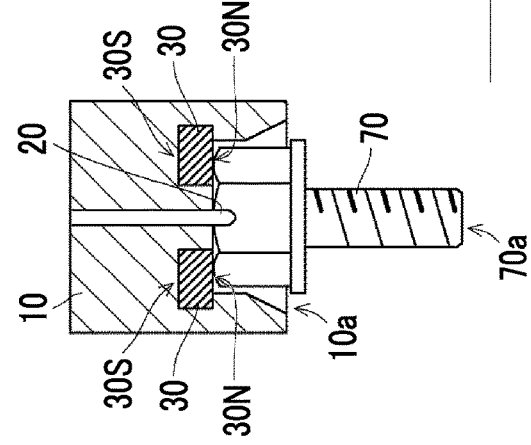

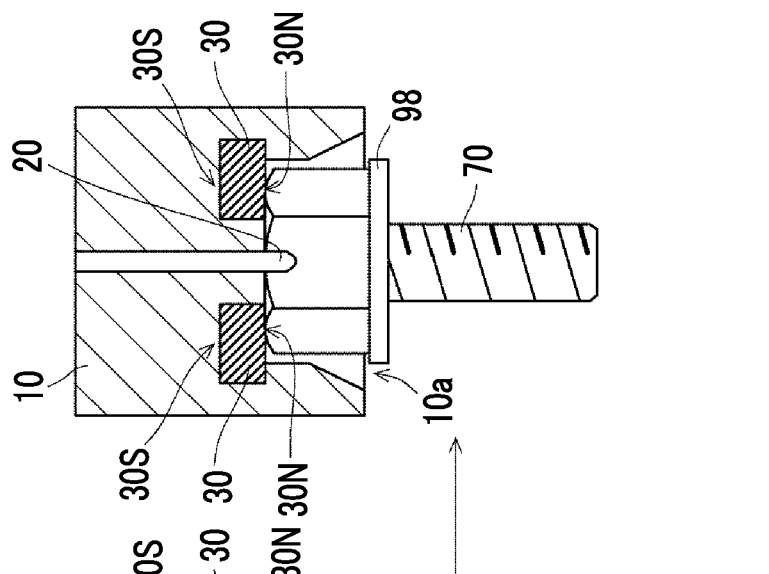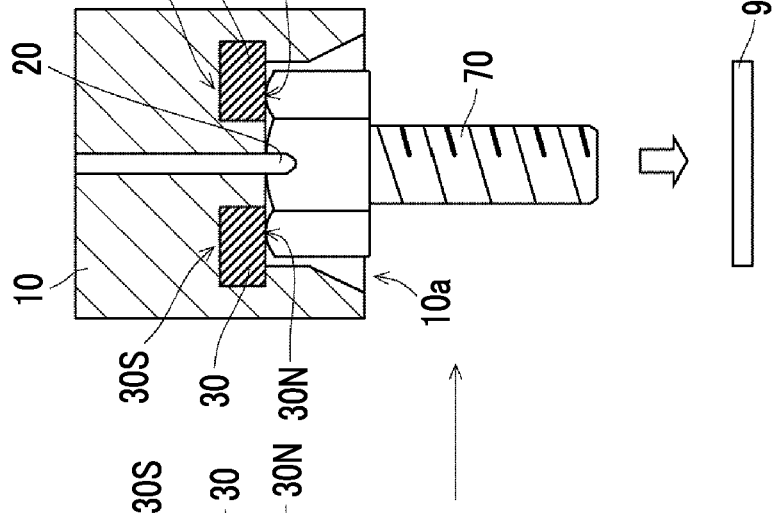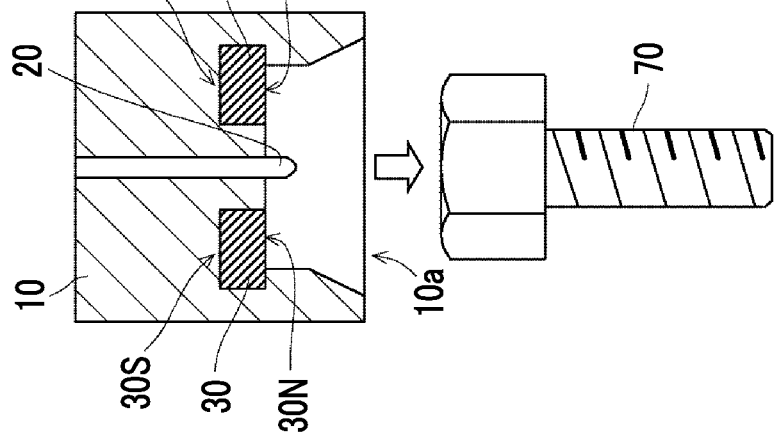

TEMPORARY FASTENING TOOL

INCORPORATION BY REFERENCE

The disclosure of Japanese Patent Application No. 2016-186796 filed on Sep. 26, 2016 including the specification, drawings and abstract is incorporated herein by reference in its entirety.

BACKGROUND

1. Technical Field

The present disclosure relates to a temporary fastening tool, and more particularly, to a temporary fastening tool configured to temporarily fasten a screwing member to a section to be screwed of a workpiece.

2. Description of Related Art

In general, before finally fastening a screwing member (a bolt, a nut, and so on) to a section to be screwed of a workpiece using a tool, the screwing member is temporarily fastened to the section to be screwed. When the screwing member is temporarily fastened to the section to be screwed in this way, while the temporary fastening is performed manually, a temporary fastening tool is used to achieve optimization of the temporary fastening.

For example, Japanese Patent Application Publication No. 2013-000871 (JP 2013-000871 A) discloses a multi-axis temporary fastening tool capable of temporarily fastening a plurality of screwing members simultaneously. The multi-axis temporary fastening tool according to JP 2013-000871 A includes a plurality of sockets and rotatably drives the plurality of sockets using a rotating force input to a tool main body to simultaneously apply the rotating force to a plurality of screwing members engaged with the plurality of sockets. A socket includes an engaging section configured to engage with a screwing member supported by one end portion of a rotary shaft formed of a magnetic body, and a magnet disposed adjacent to the engaging section and having a magnetic attractive force.

SUMMARY

In the technology according to JP 2013-000871 A, when the screwing member is inserted into the socket, corner sections of the screwing member may interfere with the engaging section, and the screwing member may not be appropriately inserted into the socket. In order to solve these problems, a configuration in which a socket is formed in a cylindrical shape, a plurality of pins are formed on an inner surface section thereof and the pins are engaged with corner sections of a screwing member, and thus, the screwing member is screwed into a section to be screwed by rotating the screwing member may be conceived. However, even in this configuration, the corner sections of the screwing member may interfere with the pins when the screwing member is inserted into the socket. Accordingly, temporary fastening may not be efficiently performed.

The present disclosure provides a temporary fastening tool capable of efficiently performing temporary fastening.

An aspect of the present disclosure is a temporary fastening tool configured to temporarily fasten a screwing member to a section to be screwed of a workpiece, the temporary fastening tool including: a tool main body; a grip installed on the tool main body; a socket rotatably supported by the tool main body and configured such that the screwing member is inserted into the socket, the socket having a cylindrical shape; a transmission mechanism configured to transmit a rotation driving force input to the grip to the socket; a plurality of pins disposed in an inner surface section of the socket to extend from a bottom section of the socket toward an opening section of the socket; and two magnets installed on the bottom section of the socket, wherein, at least portions of side surfaces of the pins protrude from the inner surface section of the socket toward a central axis of the socket, when the socket is rotated in a state in which the screwing member is inserted into the socket, the portions of the pins collide against corner sections of the screwing member and then the screwing member is rotated to be screwed into the section to be screwed, the magnets are disposed such that centers of the magnets are disposed outside of an imaginary circle having a radius of a circle that circumscribes an outer circumferential section of the screwing member that includes the corner sections, a center of the circle being on the central axis of the socket, and the magnets are disposed at positions that do not overlap the pins when the socket is seen from a side of the opening section.

As the magnets are disposed as described above, when the screwing member is inserted into the socket, the screwing member is attracted to the magnets while rotating such that the corner sections of the screwing member avoid the pins. Accordingly, interference of the corner sections of the screwing member with the pins when the screwing member is inserted into the socket is inhibited. Accordingly, the temporary fastening tool according to the present disclosure can efficiently perform temporary fastening.

In addition, the two magnets may be disposed such that directions of magnetic poles of the two magnets are different from each other. According to the above-mentioned configuration, attraction of another part to the screwing member inserted into the socket is inhibited. Accordingly, attachment of only the screwing member inserted into the socket can be performed.

In addition, the two magnets may be disposed such that directions of magnetic poles of the two magnets are the same as each other. According to the above-mentioned configuration, another part is attracted to the screwing member inserted into the socket. Accordingly, it is possible to attach not only the screwing member inserted into the socket but also a plurality of parts.

In addition, a length from the bottom section of the socket to a tip of the pin may be determined based on a tightening amount of the screwing member required during temporary fastening. According to the above-mentioned configuration, since the pin is separated from the screwing member when the temporary fastening of the screwing member is performed for a required tightening amount, further screwing of the screwing member into the section to be screwed is inhibited. Accordingly, overtightening of the screwing member during temporary fastening can be inhibited.

In addition, in the vicinity of the opening section of the socket, an inner diameter of the socket may become larger toward the opening section. According to the above-mentioned configuration, the screwing member can be easily inserted into the socket.

In addition, a tip of the pin may have a tapered shape. According to the above-mentioned configuration, when the screwing member is inserted into the socket, even if the screwing member temporarily comes in contact with the tip of the pin, the screwing member can easily avoid the pin.

In addition, the two magnets may be disposed at positions symmetrical with respect to the central axis of the socket.

In addition, an outer circumferential section of the screwing member may have a hexagonal shape, the number of the pins may be two, the two pins may be disposed symmetrically with respect to the central axis of the socket, and a line connecting the two magnets passing through the central axis of the socket and a line connecting the two pins passing through the central axis of the socket may cross each other at 90°.

According to the present disclosure, a temporary fastening tool capable of efficiently performing temporary fastening can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 14A is a view showing a behavior of a bolt when the bolt is inserted into the socket according to the first embodiment;

FIG. 14B is a view showing a behavior of a bolt when the bolt is inserted into the socket according to the first embodiment;

FIG. 14C is a view showing a behavior of a bolt when the bolt is inserted into the socket according to the first embodiment;

FIG. 15A is a view showing a behavior of a bolt when the bolt is inserted into the socket according to the first embodiment;

FIG. 15B is a view showing a behavior of a bolt when the bolt is inserted into the socket according to the first embodiment;

FIG. 31A is a view showing a state in which a bolt is inserted into the socket according to the second embodiment;

FIG. 31B is a view showing a state in which a bolt is inserted into the socket according to the second embodiment;

FIG. 31C is a view showing a state in which a bolt is inserted into the socket according to the second embodiment;

FIG. 33A is a view showing a state in which a bolt is inserted into the socket according to a third embodiment;

FIG. 33B is a view showing a state in which a bolt is inserted into the socket according to the third embodiment;

FIG. 33C is a view showing a state in which a bolt is inserted into the socket according to the third embodiment;

FIGS. 34A to 34C are views showing an application example of the socket according to the third embodiment.

DETAILED DESCRIPTION OF EMBODIMENTS

Hereinafter, embodiments of the present disclosure will be described with reference to the accompanying drawings. However, the present disclosure is not limited to the following embodiments. In addition, for clarification of description, the following description and the accompanying drawings will be appropriately simplified.

First Embodiment

Figure 1:
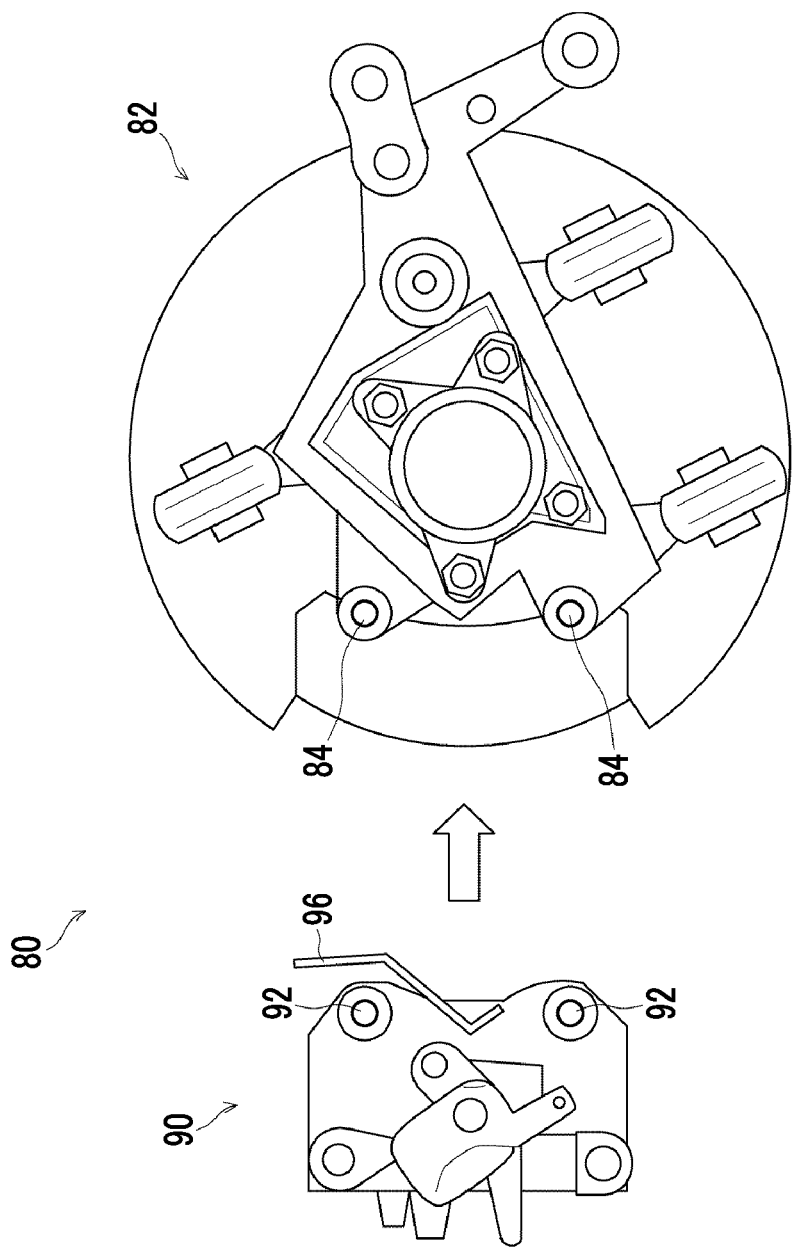
FIG. 1 is a view showing a workpiece serving as an application target of a temporary fastening tool according to a first embodiment.
Figure 2:
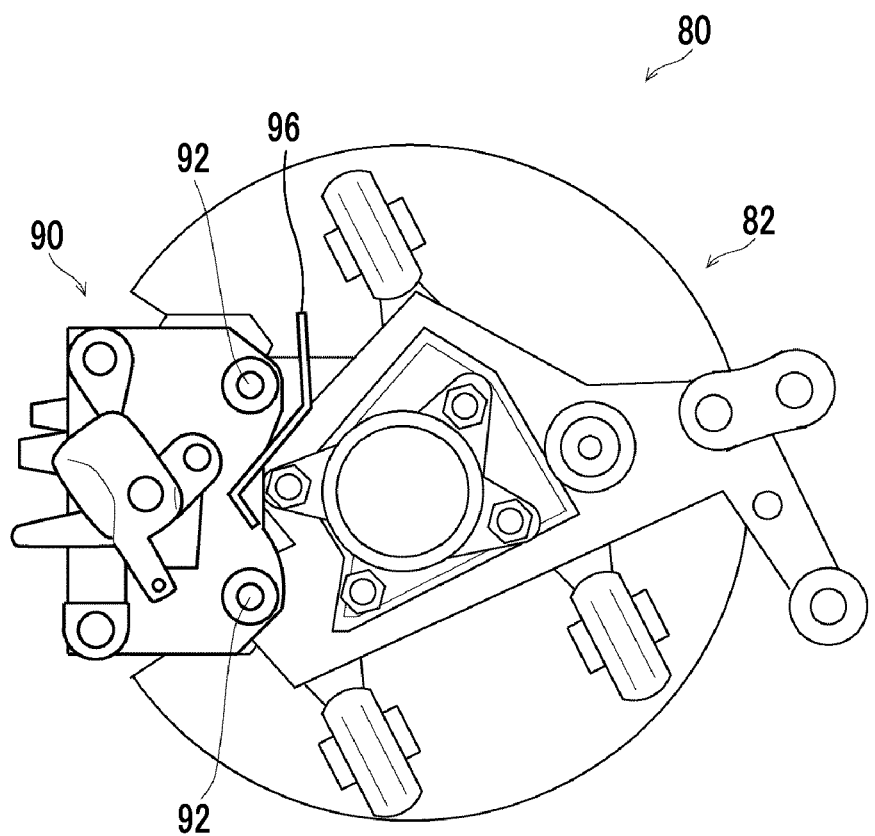
FIG. 2 is a view showing a workpiece serving as an application target of the temporary fastening tool according to the first embodiment.

FIG. 1 and FIG. 2 are views showing a workpiece 80 serving as an application target of a temporary fastening tool according to a first embodiment. The workpiece 80 is constituted by setting a caliper 90 on an axle of a carrier 82 and is brought into a state shown in FIG. 2 from a state shown in FIG. 1. Here, a female screw section 92 (a section to be screwed) of the caliper 90 is aligned with a through-hole 84 of the carrier 82. Then, a bolt (a screwing member) is screwed and temporarily fastened to the female screw section 92 using the temporary fastening tool according to the first embodiment. In addition, a bracket 96 is installed on the caliper 90.

Figure 3:
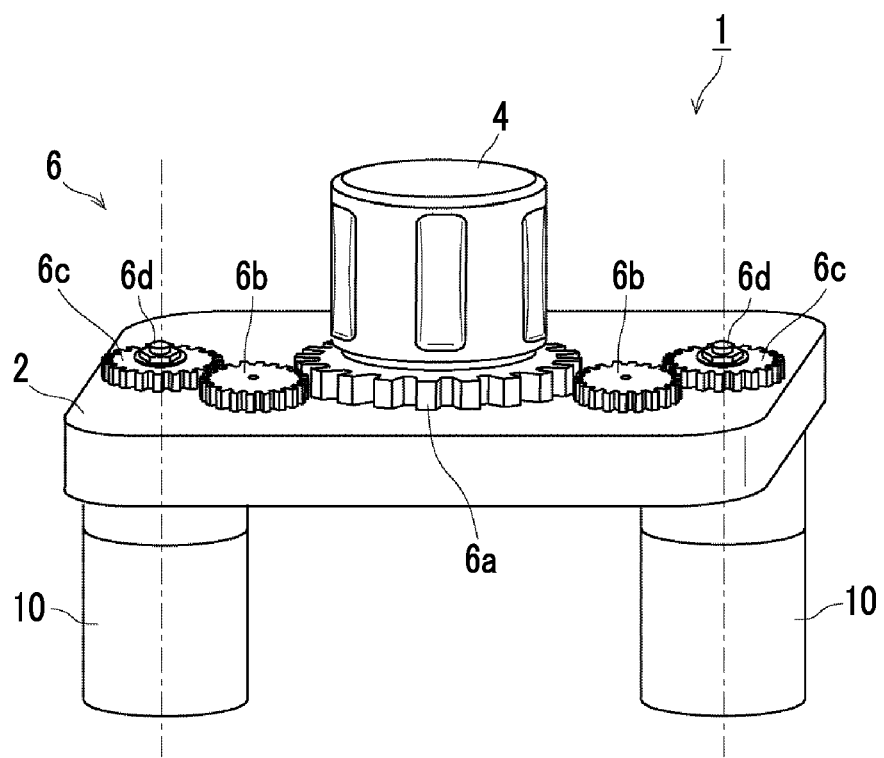
FIG. 3 is a view showing the temporary fastening tool according to the first embodiment.
Figure 4:
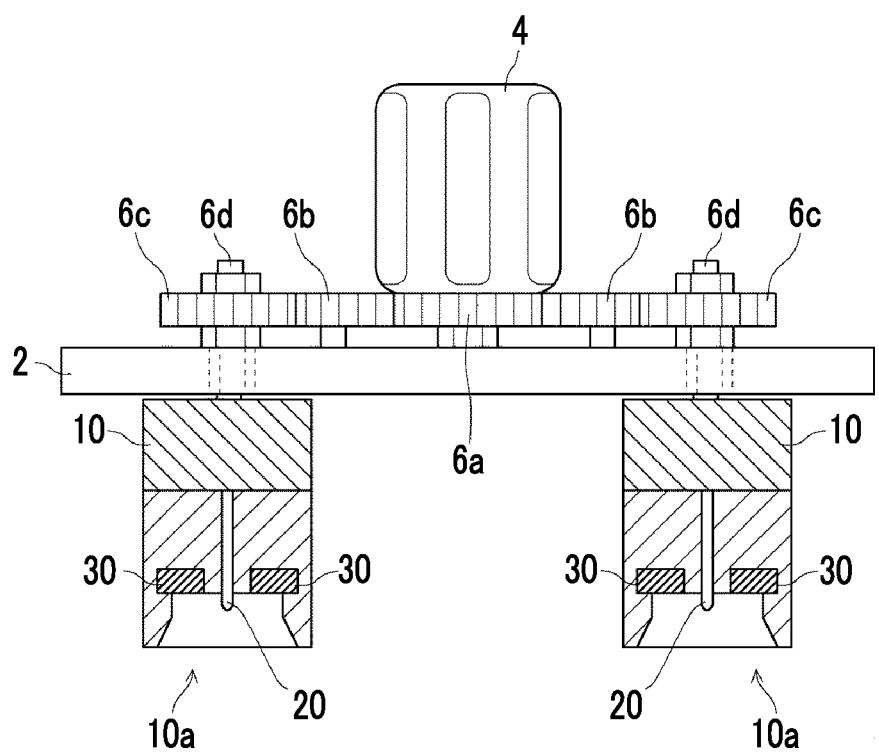
FIG. 4 is a view showing the temporary fastening tool according to the first embodiment.

FIG. 3 and FIG. 4 are views showing a temporary fastening tool 1 according to the first embodiment. FIG. 3 is a perspective view of the temporary fastening tool 1 and FIG. 4 is a side view of the temporary fastening tool 1. The temporary fastening tool 1 has a tool main body 2, a grip 4, a transmission mechanism 6, a socket 10, a pin 20 and a magnet 30. The tool main body 2 is formed in a plate shape. The grip 4 is rotatably installed on the tool main body 2. The socket 10 is formed in a cylindrical shape and rotatably supported by the tool main body 2. As described below, the transmission mechanism 6 is constituted by gears and rotary shafts. The number of gears and the number of rotary shafts correspond to the number of the sockets 10.

When a worker grips the grip 4 with the fingers and rotates the grip 4, the socket 10 is rotated via the transmission mechanism 6. That is, the transmission mechanism 6 transmits a rotation driving force input to the grip 4 to the socket 10. The transmission mechanism 6 has a gear 6a fixed to the grip 4, a gear 6b meshed with the gear 6a, a gear 6c meshed with the gear 6b, and a rotary shaft 6d fixed to a center of the gear 6c. A tip of the rotary shaft 6d is fixed to the socket 10.

The gear 6a is rotated according to rotation of the grip 4, the gear 6b is rotated by rotation of the gear 6a, and the gear 6c is rotated by rotation of the gear 6b. Accordingly, since the rotary shaft 6d is rotated, the socket 10 is also rotated. In this way, the rotation driving force input to the grip 4 is transmitted to the socket 10 via the transmission mechanism 6.

A plurality of pins 20 having a substantially columnar shape and two magnets 30 having a substantially columnar shape are installed in the socket 10. The pins 20 and the magnets 30 will be described below. A bolt is inserted from an opening section 10a of the socket 10. Here, the bolt is attracted to the magnet 30 by a magnetic force of the magnet 30. Accordingly, a bolt 70 can be prevented from falling out of the socket 10.

Figure 5:
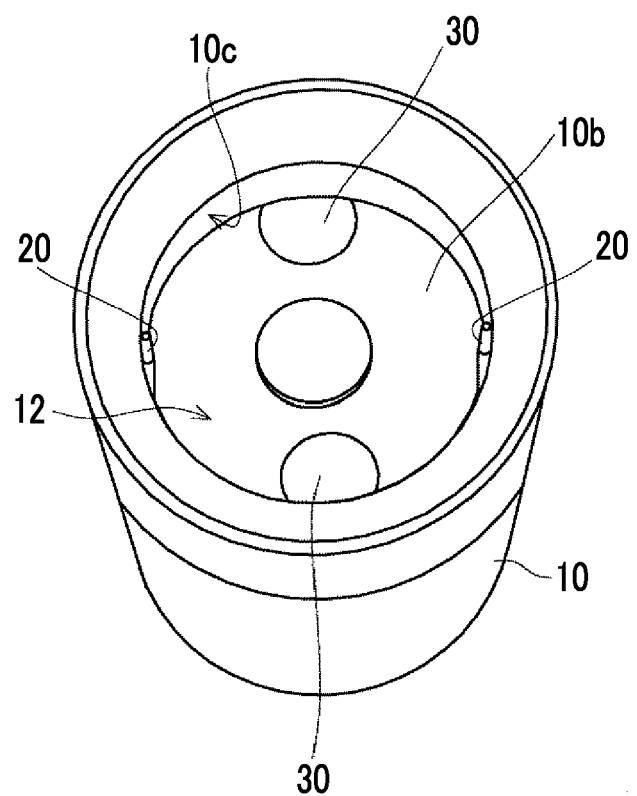
FIG. 5 is a perspective view showing a socket according to the first embodiment.
Figure 6:
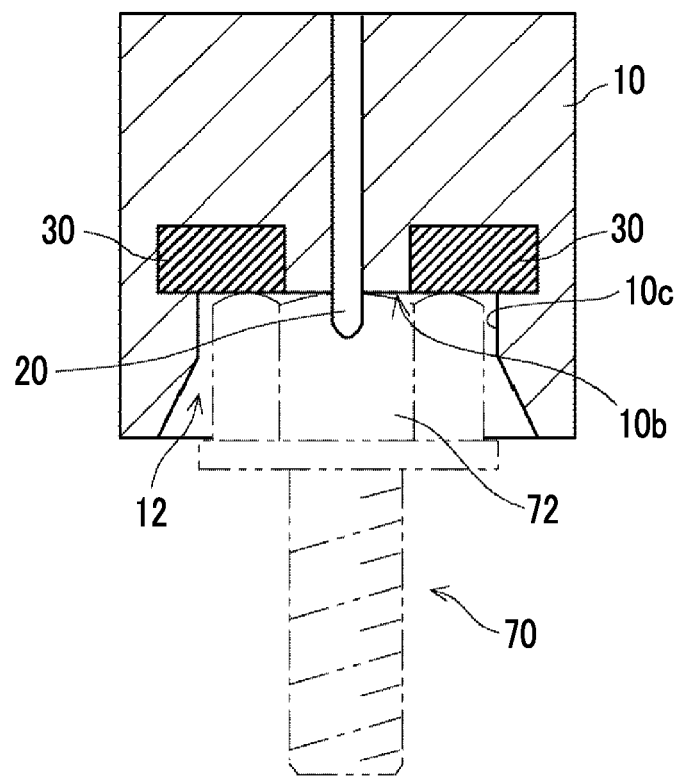
FIG. 6 is a cross-sectional view showing the socket according to the first embodiment.
Figure 7:
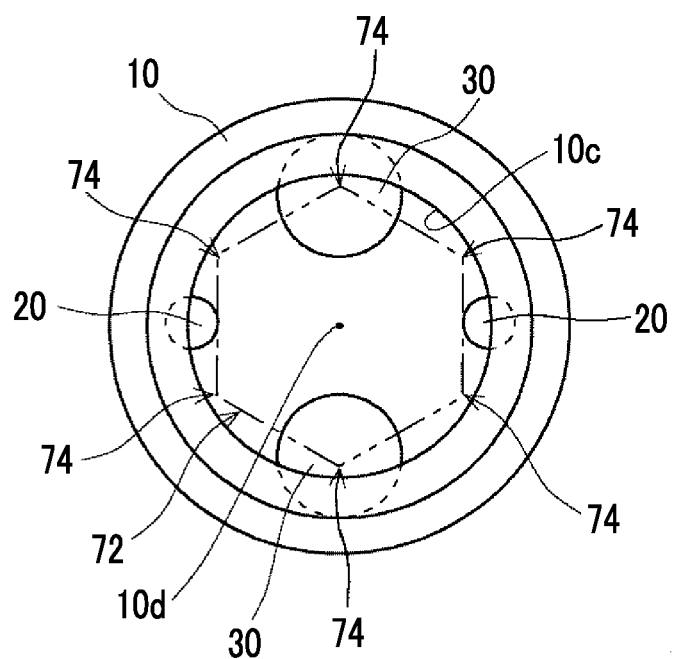
FIG. 7 is a plan view of the socket according to the first embodiment when seen from a side of an opening section.

FIG. 5 is a perspective view showing the socket 10 according to the first embodiment. FIG. 5 is a view showing the socket 10 from the side of the opening section 10a. In addition, FIG. 6 is a cross-sectional view showing the socket 10 according to the first embodiment. In addition, FIG. 7 is a plan view showing the socket 10 according to the first embodiment from the side of the opening section 10a. Further, the bolt 70 is shown in FIG. 6 and FIG. 7. Here, in the embodiment, while the bolt 70 is a hexagonal head bolt, the bolt 70 is not limited thereto.

The socket 10 has a bottom section 10b and an inner surface section 10c. A head section 72 of the bolt 70 (an outer circumferential section of the bolt) is accommodated in an accommodating section 12 formed by the bottom section 10b and the inner surface section 10c. The pins 20 are installed on the inner surface section 10c. In the embodiment, the two pins 20 are installed at positions facing each other on the inner surface section 10c. That is, the two pins 20 are disposed at sides opposite to each other with respect to a central axis 10d of the socket 10. Preferably, the two pins 20 are disposed at positions symmetrical with respect to the central axis 10d.

In addition, as described below, at least a part of a side surface of the pin 20 protrudes from the inner surface section 10c toward the central axis 10d. Accordingly, when the socket 10 is rotated during temporary fastening, protruding portions of the pins 20 collide against corner sections 74 of the head section 72 of the bolt 70. Since the bolt 70 is rotated as the pins 20 are hooked to (engaged with) the corner sections 74 in this way, the bolt 70 is screwed to the female screw section 92. Detailed description will be provided below.

The magnet 30 is installed in the bottom section 10b of the socket 10. The two magnets 30 are disposed at sides opposite to each other with respect to the central axis 10d of the socket 10. Preferably, the two magnets 30 are disposed at positions symmetrical with respect to the central axis 10d of the socket 10.

Here, when the socket 10 is seen from the side of the opening section 10a, the two magnets 30 are disposed at positions that do not overlap the two pins 20. In other words, when a circle centered on the central axis 10d of the socket 10 is assumed, the two magnets 30 are disposed such that phases of the magnets 30 are not the same as phases of the pins 20. In an example shown in FIG. 7, when a phase of the magnet 30 on an upper side is 0° and a clockwise direction is positive, a phase of the pin 20 on a right side is 90°, a phase of the magnet 30 on a lower side is 180°, and a phase of the pin 20 on a left side is 270°. As the magnet 30 is disposed in this way, when the bolt 70 is inserted into the socket 10, the corner sections 74 of the head section 72 of the bolt 70 can be inhibited from interfering with the pins 20. Detailed description will be provided below.

Figure 8:
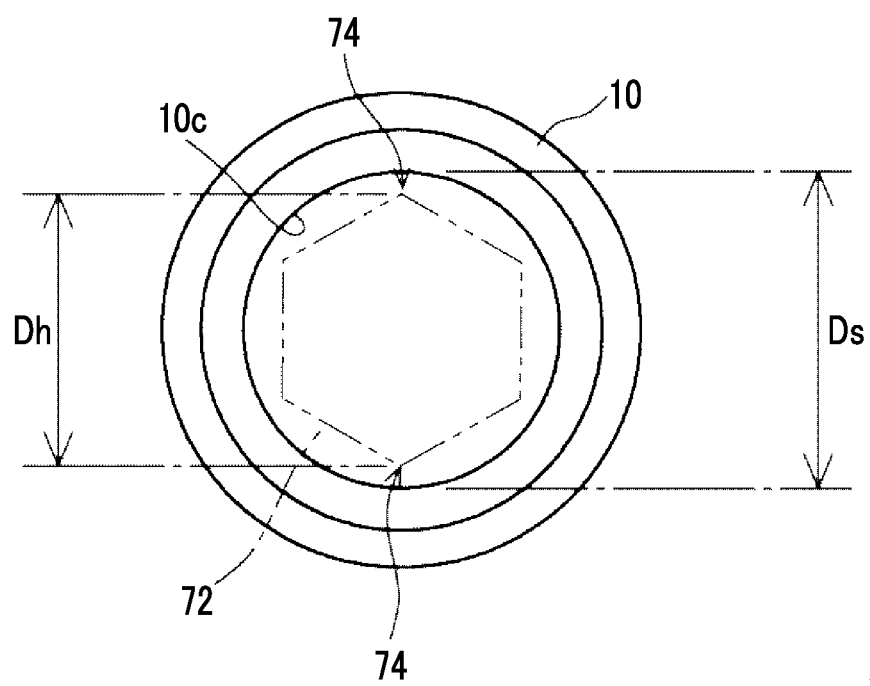
FIG. 8 is a view for describing that a bolt can be easily inserted into the socket according to the first embodiment.
Figure 9:
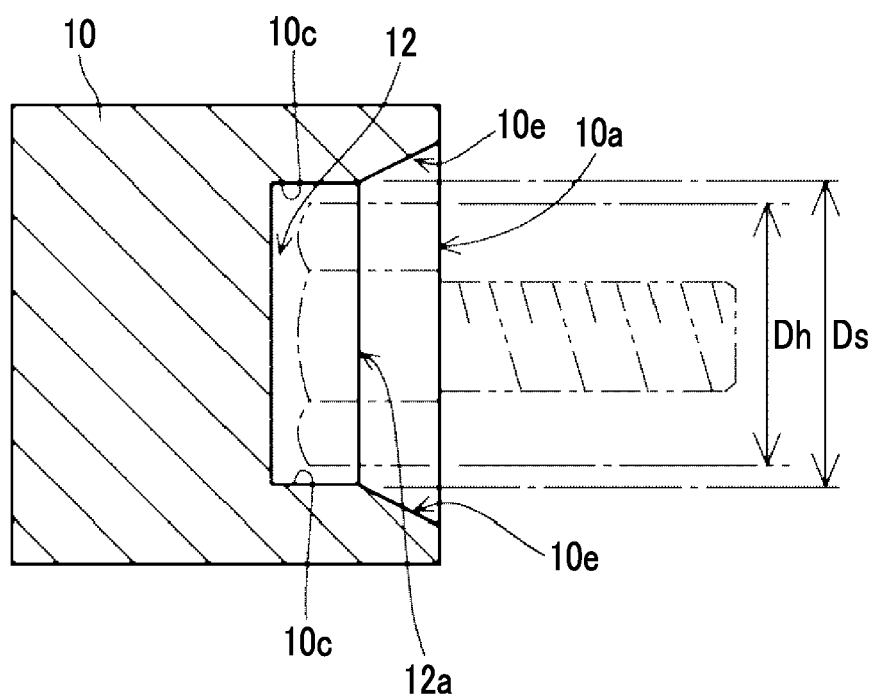
FIG. 9 is a view for describing that the bolt can be easily inserted into the socket according to the first embodiment.

FIG. 8 and FIG. 9 are views for describing that the bolt 70 is easily inserted into the socket 10 according to the first embodiment. FIG. 8 is a plan view showing the socket 10 from the side of the opening section 10a, and FIG. 9 is a cross-sectional view showing the socket 10 from a side surface side. Further, in FIG. 8 and FIG. 9, the pins 20 and the magnets 30 are omitted.

As shown in FIG. 8 and FIG. 9, an inner diameter Ds of the socket 10 is larger than a diameter Dh of the head section 72 of the bolt 70 (a distance between the two corner sections 74 disposed at diagonally opposite positions in the head section 72). The inner diameter Ds is appropriately determined according to the diameter Dh of the head section 72, a diameter of the pin 20, and the like. In addition, an inclined surface 10e in which an inner diameter of the socket 10 increases from an end portion 12a of the accommodating section 12 toward the opening section 10a is formed in the vicinity of the opening section 10a of the socket 10. In this way, since the inclined surface 10e is formed in the vicinity of the opening section 10a and further the inner diameter Ds is larger than the diameter Dh of the head section 72, the bolt 70 can be easily inserted into the accommodating section 12.

Figure 10:
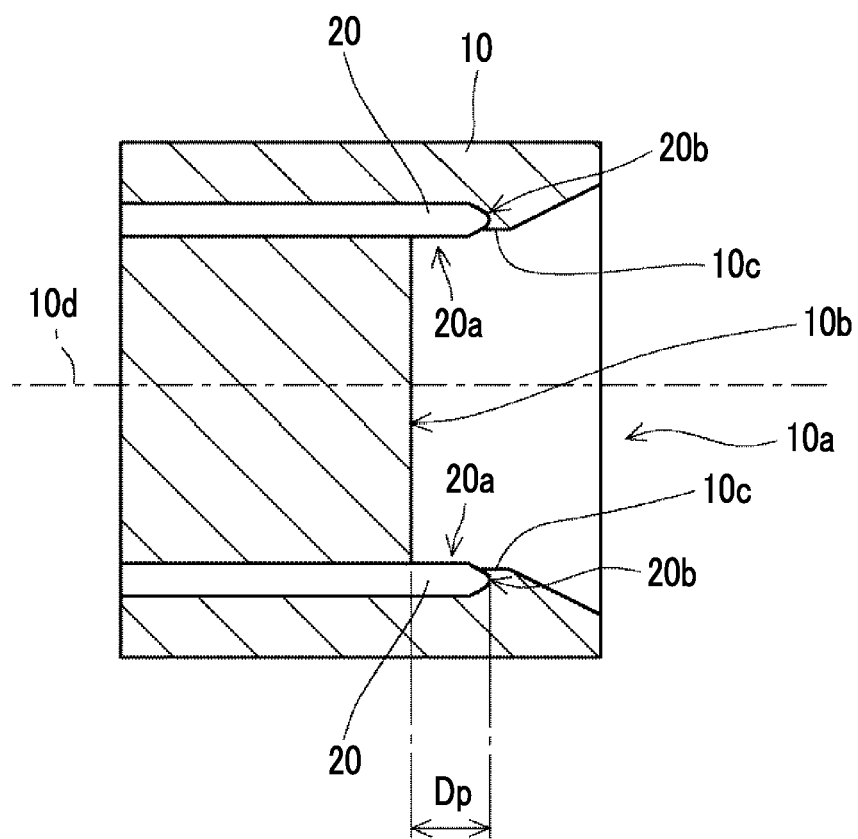
FIG. 10 is a view for describing pins installed in the socket according to the first embodiment.
Figure 11:
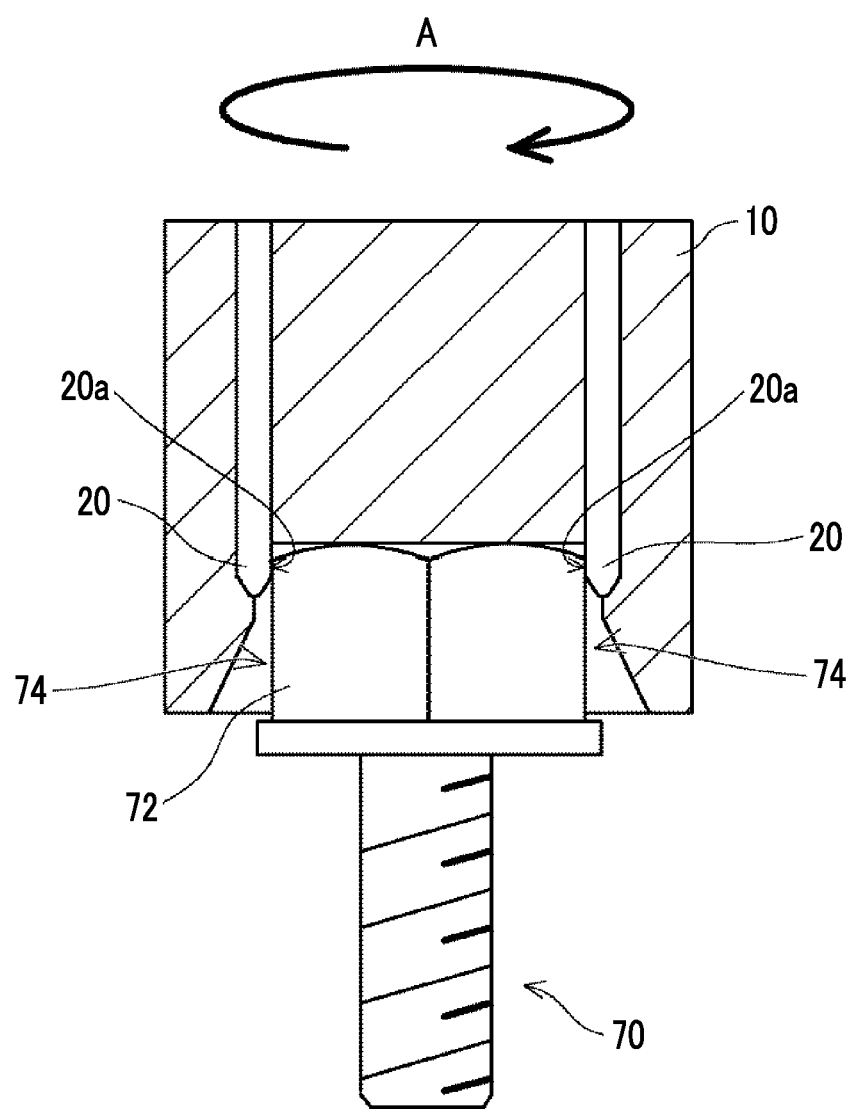
FIG. 11 is a view for describing pins installed in the socket according to the first embodiment.

FIG. 10 and FIG. 11 are views for describing the pins 20 installed in the socket 10 according to the first embodiment. Further, in FIG. 10 and FIG. 11, the magnets 30 are omitted. The pins 20 are disposed to extend from the bottom section 10b toward the opening section 10a. In addition, as described below, at least a part of a side surface 20a of the pin 20 protrudes toward the central axis 10d of the socket 10. Accordingly, as shown in FIG. 11, when the socket 10 is rotated as shown by an arrow A, the protruded side surfaces 20a of the pins 20 are hooked by the corner sections 74 of the head section 72 of the bolt 70. Accordingly, the bolt 70 can also be rotated according to rotation of the socket 10.

In addition, preferably, a tip 20b of the pin 20 is formed in a tapered shape. In addition, a projection allowance Dp that is a protrusion length of the pin 20 from the bottom section 10b of the socket 10 (a distance from the bottom section 10b to the tip 20b of the pin 20) can be appropriately determined according to a tightening amount of the bolt 70, a magnetic force of the magnet 30, and so on, as described below.

Figure 12:
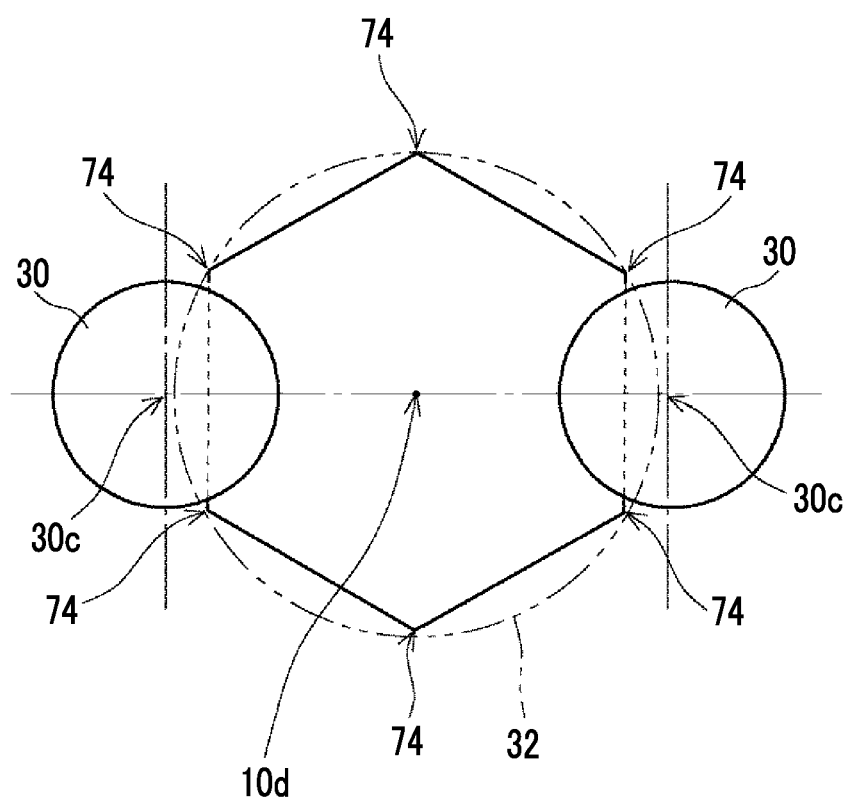
FIG. 12 is a view for describing the disposition of magnets installed in the socket according to the first embodiment.
Figure 13:
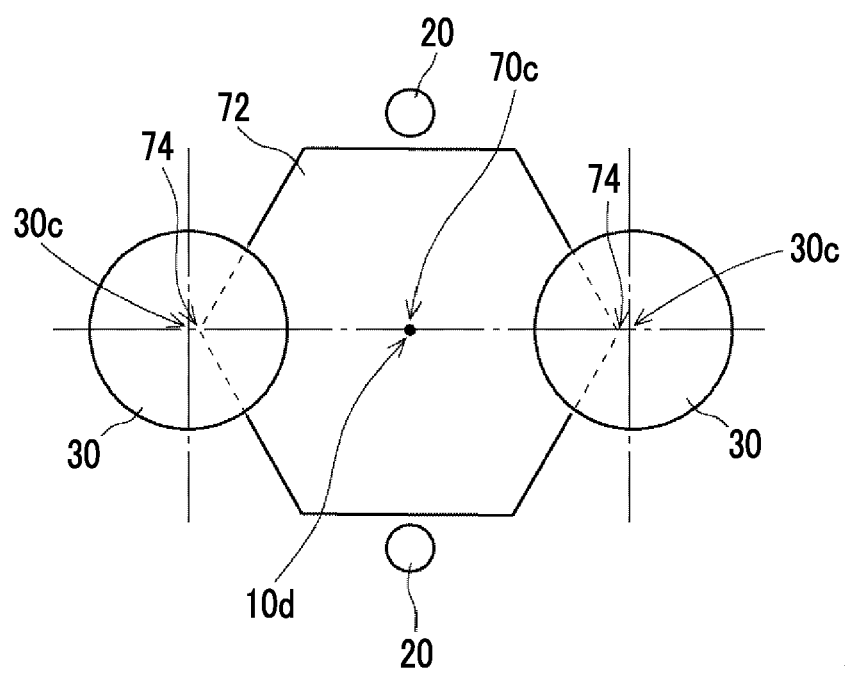
FIG. 13 is a view for describing the disposition of magnets installed in the socket according to the first embodiment.

FIG. 12 and FIG. 13 are views for describing the disposition of the magnets 30 installed in the socket 10 according to the first embodiment. As shown in FIG. 12, in the bottom section 10b of the socket 10, an imaginary circle 32 having a radius that is a radius of a circle circumscribing the head section 72 of the bolt 70 is assumed. The center of the circle is on the central axis 10d of the socket 10. Here, the magnets 30 are disposed such that centers 30c of the magnets 30 are positioned outside the imaginary circle 32. According to such a disposition, when the head section 72 of the bolt 70 is inserted into the accommodating section 12 of the socket 10, as shown in FIG. 13, the two opposite corner sections 74 are directed toward the centers 30c of the opposite two magnets 30 by the magnetic forces of the magnets 30. In this way, an orientation of the head section 72 when the head section 72 of the bolt 70 is inserted into the accommodating section 12 of the socket 10 is stabilized. Then, as described above, since the magnets 30 are disposed such that phases of the magnets 30 are not the same as phases of the pins 20, the corner sections 74 of the bolt 70 do not interfere with the pins 20. Accordingly, the temporary fastening can be efficiently performed.

Further, when the magnetic forces of the two magnets 30 are equal to each other, the head section 72 of the bolt 70 moves in a direction in which a central axis 70c of the bolt 70 coincides with the central axis 10d of the socket 10. Accordingly, the central axis 70c of the bolt 70 is inhibited from being deviated from the central axis 10d of the socket 10. Accordingly, since defects during the temporary fastening is inhibited, the temporary fastening can be more efficiently performed.

Further, reasons for disposing the centers 30c of the magnets 30 positioned outside the imaginary circle 32 and directing the corner sections 74 toward the centers 30c of the magnets 30 are considered to be the following two reasons. A first reason is that, since the magnetic forces of the magnets 30 are strongest at centers of the magnets 30, the corner sections 74 are attracted to the centers of the magnets 30. A second reason is that, since areas of the magnets 30 in contact with the head section 72 are largest when the corner sections 74 are directed toward the centers 30c of the magnets 30, the magnetic forces applied to the corner sections 74 opposite to each other are balanced and the bolt 70 is stabilized when the corner sections 74 are directed toward the centers 30c of the magnets 30.

FIGS. 14A to 14C and FIGS. 15A and 15B are views showing a behavior of the bolt 70 when the bolt 70 is inserted into the socket 10 according to the first embodiment. FIGS. 14A to 14C are cross-sectional views of the socket 10 when seen from a side surface thereof, and FIGS. 15A and 15B are plan views of the socket 10 when seen from the side of the opening section 10a. Further, in FIGS. 15A and 15B, in order to distinguish between the six corner sections 74, the corner sections 74 are designated as corner sections 74A, 74B, 74C, 74D, 74E and 74F. In addition, FIG. 15A is a plan view in a state shown in FIGS. 14A and 14B, and FIG. 15B is a plan view in a state shown in FIG. 14C.

As shown in FIG. 14A and FIG. 15A, the bolt 70 and the socket 10 have a positional relation in which the corner sections 74 (the corner section 74A and the corner section 74D) of the bolt 70 are opposite to the pins 20. Here, the socket 10 approaches the bolt 70 as shown by an arrow B of FIG. 14B. Then, as shown by an arrow C of FIG. 14C, the bolt 70 is drawn to the bottom section 10b of the socket 10 by the magnetic forces of the magnets 30.

In this case, if the bolt 70 does not rotate around the central axis 70c, the corner section 74A and the corner section 74D interfere with the pin 20. However, in the embodiment, since the magnets 30 are disposed as described using FIG. 12 and FIG. 13, as shown by an arrow D of FIG. 14C, the bolt 70 is rotated about the central axis 70c such that the two opposite corner sections 74 (the corner section 74B and the corner section 74E, or the corner section 74C and the corner section 74F) are directed toward the centers 30c of the magnets 30. Further, when the bolt 70 is rotated clockwise in FIG. 15A, the two corner sections 74B and 74E opposite to each other as shown in FIG. 15B are directed toward the centers 30c of the magnets 30. Meanwhile, when the bolt 70 is rotated counterclockwise in FIG. 15A, the two opposite corner sections 74C and 74F are directed toward the centers 30c of the magnets 30.

Here, as described using FIG. 7, since the magnets 30 are disposed such that phases of the magnets 30 are not equal to phases of the pins 20, the bolt 70 is rotated such that the corner sections 74 (the corner section 74A and the corner section 74D) avoid the pins 20. Accordingly, the corner sections 74 are inhibited from interfering with the pins 20. Further, even when the corner sections 74 come in contact with the pins 20, since the tips 20b of the pins 20 have a tapered shape, the corner sections 74 (the head section 72) can easily avoid the pins 20. That is, the corner sections 74 in contact with the tips 20b of the pins 20 are easily guided to the accommodating section 12 along the inclined surfaces of the tips 20b of the pins 20 having a tapered shape.

Then, as shown in FIG. 15B, the bolt 70 is stabilized in the accommodating section 12 of the socket 10 such that the two opposite corner sections 74 (in an example of FIG. 15, the corner section 74B and the corner section 74E) are directed toward the centers 30c of the magnets 30. As a result, in the embodiment, when the bolt 70 is inserted into the socket 10, a posture of the bolt 70 can be stabilized. Accordingly, the temporary fastening can be efficiently performed. Further, when the magnetic forces of the two magnets 30 are equal to each other, the bolt 70 is stabilized in the accommodating section 12 of the socket 10 such that the central axis 70c of the bolt 70 is aligned with the central axis 10d of the socket 10. Accordingly, the temporary fastening can be more efficiently performed.

Figure 16:
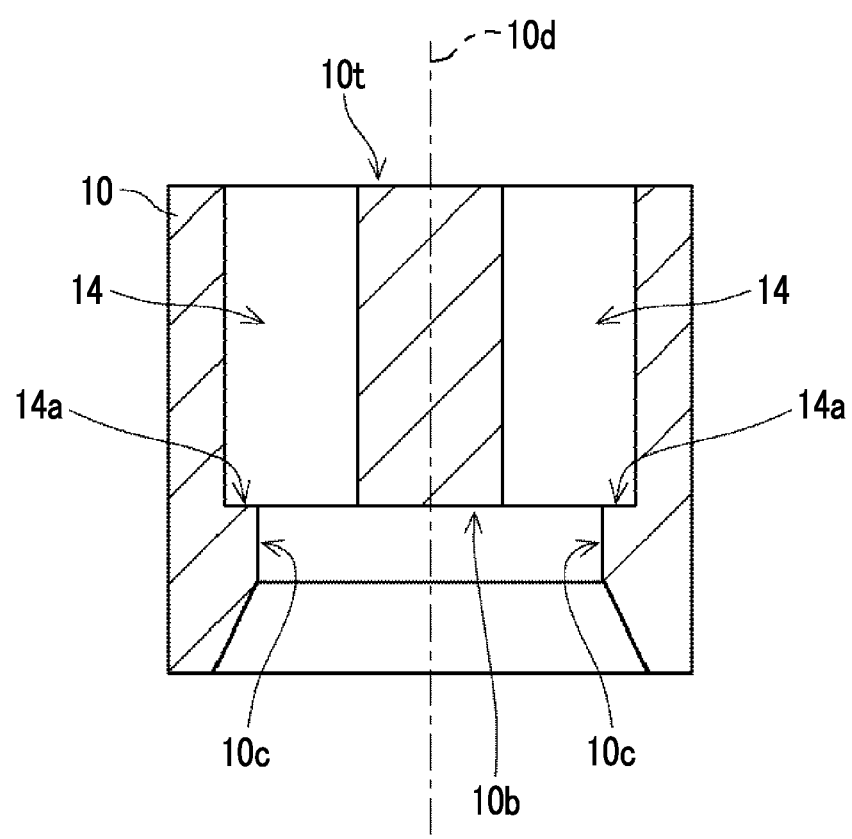
FIG. 16 is a view for describing a method of attaching the magnets to the socket according to the first embodiment.
Figure 17A:
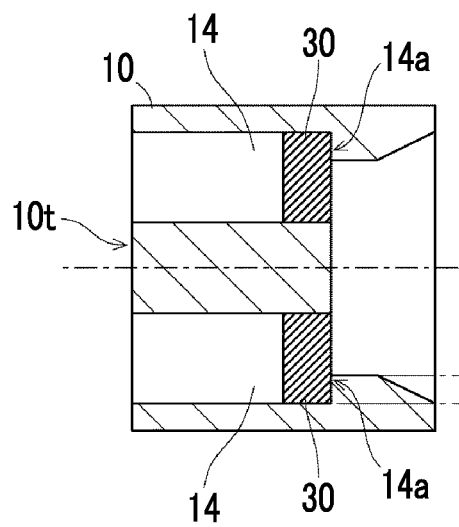
FIG. 17A is a view for describing the method of attaching the magnets to the socket according to the first embodiment.
Figure 17B:
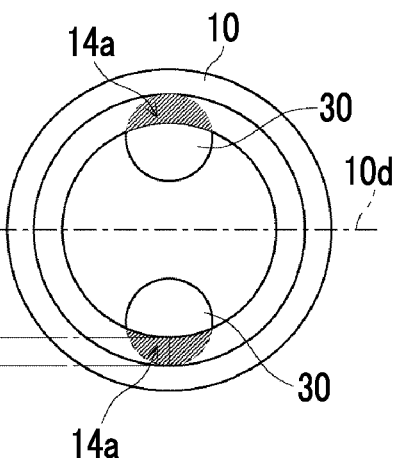
FIG. 17B is a view for describing the method of attaching the magnets to the socket according to the first embodiment.

FIG. 16 and FIGS. 17A and 17B are views for describing a method of attaching the magnets 30 to the socket 10 according to the first embodiment. FIG. 17A is a cross-sectional view of the socket 10 and FIG. 17B is a plan view of the socket 10 when seen from the side of the opening section 10a. In FIG. 16 and FIGS. 17A and 17B, the pins 20 are omitted. As shown in FIG. 16, two magnet attachment holes 14 are formed in the socket 10.

The magnet attachment holes 14 are formed from an upper end portion 10t of the socket 10 to the bottom section 10b. An inner diameter of the magnet attachment hole 14 is substantially equal to a diameter of the magnet 30. The two magnet attachment holes 14 are disposed at positions opposite to each other with respect to the central axis 10*d* of the socket 10. Preferably, the two magnet attachment holes 14 are disposed at positions symmetrical with respect to the central axis 10*d* of the socket 10.

Here, not all of the magnet attachment hole 14 penetrates to the bottom section 10*b* of the socket 10. Portions of the magnet attachment holes 14 are disposed outside the inner surface section 10*c*, and falling out prevention sections 14*a* configured to prevent the magnets 30 from falling out to the side of the opening section 10*a* are formed. Accordingly, as shown in FIGS. 17A and 17B, when the magnets 30 are inserted into the magnet attachment holes 14 from the upper end portions 10*t* of the socket 10, the magnets are hooked by the falling out prevention sections 14*a*. Accordingly, the magnets 30 can be prevented from falling out to the side of the opening sections 10*a*.

Figure 18:
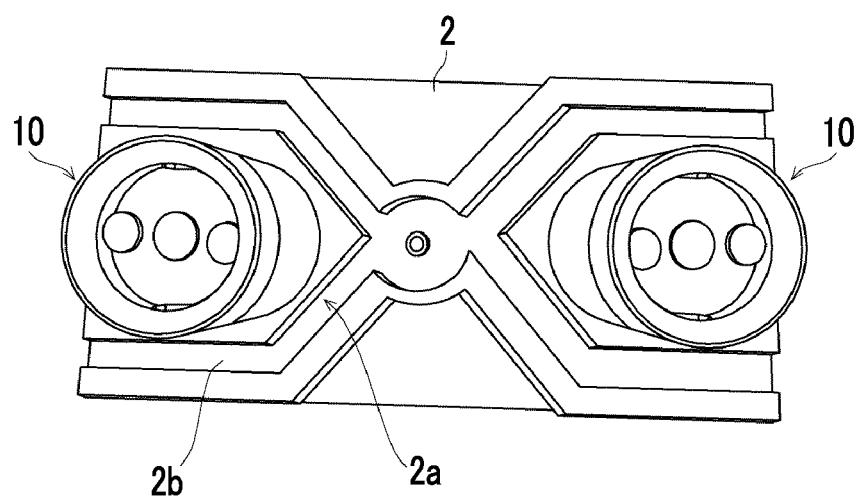
FIG. 18 is a view showing a tool main body of the temporary fastening tool according to the first embodiment from a side at which the socket is installed.

FIG. 18 is a view of the tool main body 2 of the temporary fastening tool 1 according to the first embodiment when seen from a side at which the socket 10 is installed. A positioning groove 2*a* configured to perform positioning between the temporary fastening tool 1 and the workpiece 80 (the caliper 90) when the bolt 70 is temporarily fastened to the female screw section 92 is formed in the tool main body 2. The positioning groove 2*a* is formed to correspond to a shape of the bracket 96 of the caliper 90. That is, when the bolt 70 is temporarily fastened to the female screw section 92, the bracket 96 is inserted into the positioning groove 2*a*. Accordingly, positioning between the temporary fastening tool 1 and the workpiece 80 can be performed.

Further, as described below, when the bolt 70 is temporarily fastened to the female screw section 92, as the bracket 96 butts against a groove bottom 2*b* of the positioning groove 2*a*, excessive tightening of the bolt 70 can be prevented. Further, in the embodiment, four positioning grooves 2*a* are formed line-symmetrically or point-symmetrically such that the temporary fastening tool 1 can be positioned in any direction with respect to the bracket 96. However, the number of the positioning grooves 2*a* is arbitrary.

Figure 19:
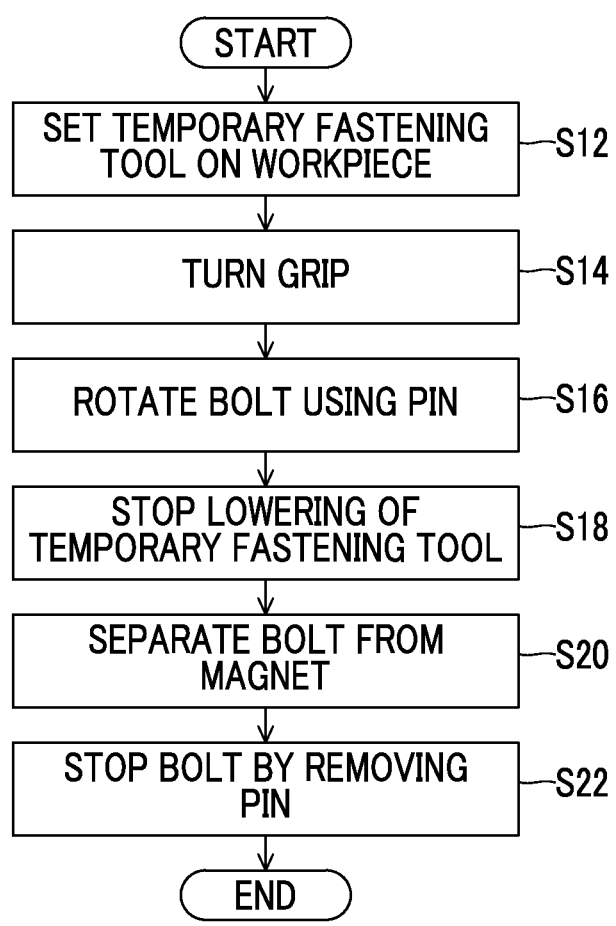
FIG. 19 is a flowchart showing a temporary fastening method using a temporary fastening tool according to the first embodiment.

Next, a temporary fastening method using the temporary fastening tool 1 according to the first embodiment will be described. FIG. 19 is a flowchart showing the temporary fastening method using the temporary fastening tool 1 according to the first embodiment. In addition, FIG. 20 to FIG. 24 are view for describing the temporary fastening method using the temporary fastening tool 1 according to the first embodiment.

Figure 20:
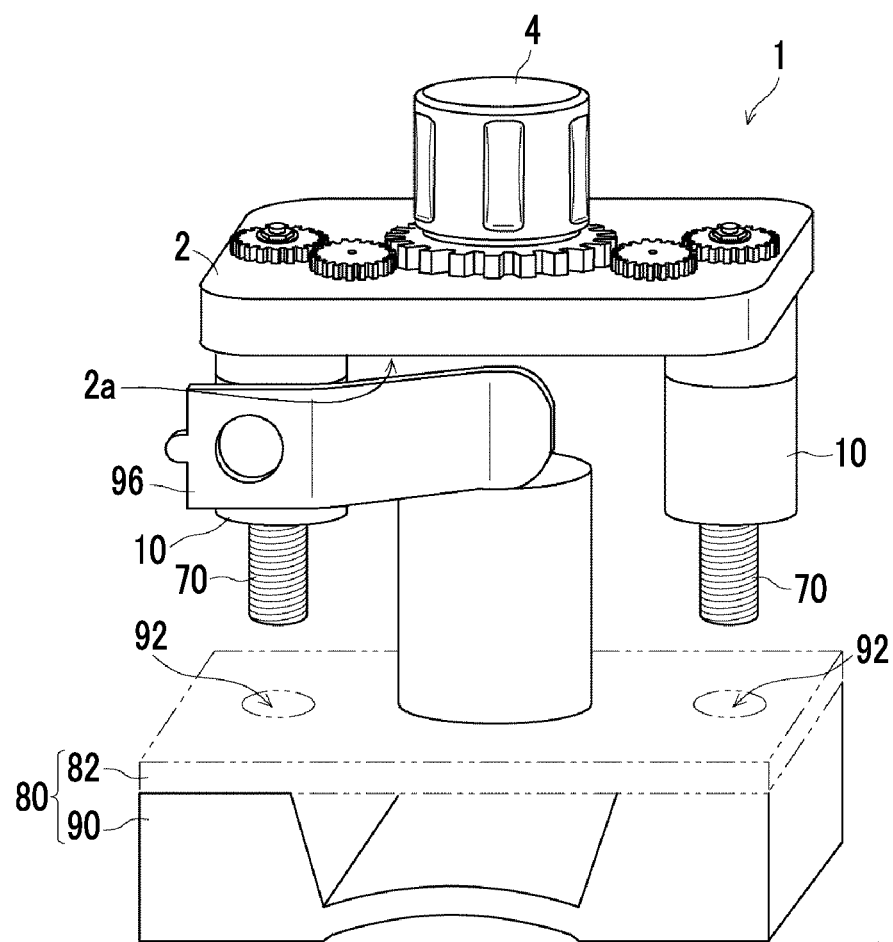
FIG. 20 is a view for describing the temporary fastening method using the temporary fastening tool according to the first embodiment.
Figure 21:
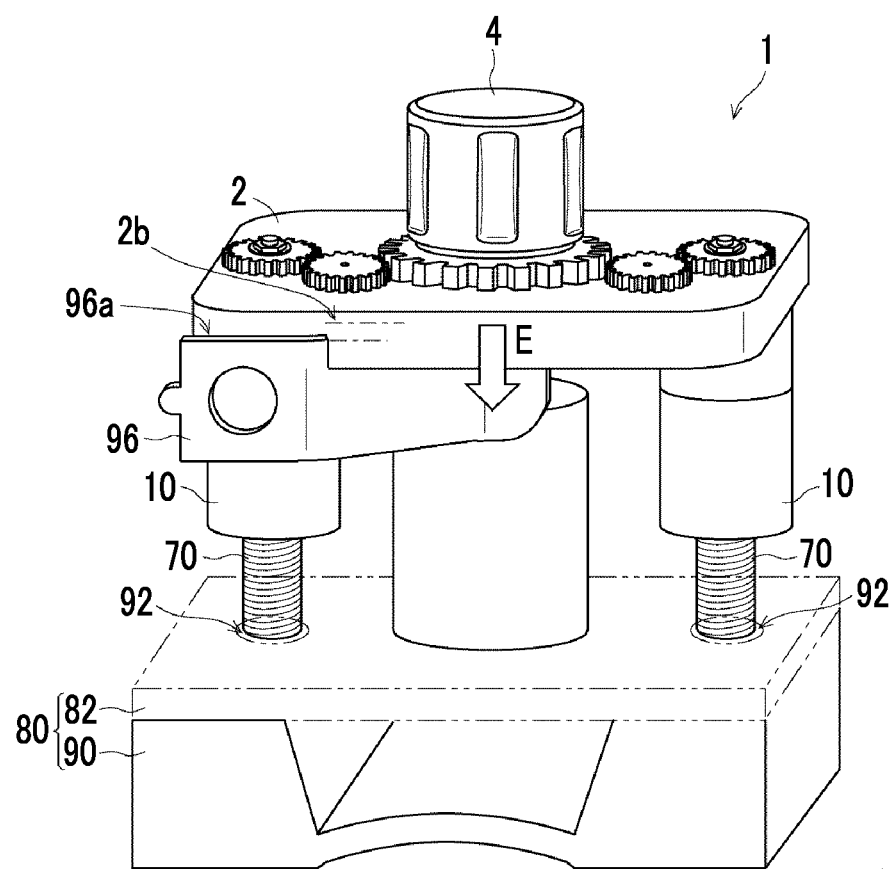
FIG. 21 is a view for describing the temporary fastening method using the temporary fastening tool according to the first embodiment.

First, the temporary fastening tool 1 is set on the workpiece 80 (step S12). Here, as shown in FIG. 20, the temporary fastening tool 1 is set on the workpiece 80 such that a tip of the bolt 70 butts against an inlet of the female screw section 92, as shown in FIG. 21, from a position of the temporary fastening tool 1 at which the bracket 96 is opposite to the positioning groove 2*a* and the tip of the bolt 70 is opposite to the female screw section 92. At this point, while the bracket 96 is inserted into the positioning groove 2*a*, an upper end 96*a* of the bracket 96 does not collide against the groove bottom 2*b*. Accordingly, the temporary fastening tool 1 is supported by the workpiece 80 at the tip of the bolt 70. Further, as shown in FIG. 6, FIG. 7, FIG. 14C and FIG. 15B, the bolt 70 is in the socket 10 in a state in which the two opposite corner sections 74 are directed toward the centers 30*c* of the magnets 30 and the central axis 70*c* of the bolt 70 is aligned with the central axis 10*d* of the socket 10.

Next, a worker turns the grip 4 (step S14). Accordingly, since the socket 10 is rotated via the transmission mechanism 6, as described above, the bolt 70 is rotated by the pins 20 installed in the socket 10 (step S16). When the bolt 70 is rotated, since the bolt 70 is screwed into the female screw section 92, the bolt 70 gradually enters the female screw section 92 and descends. Accordingly, as shown by an arrow E, the temporary fastening tool 1 also descends.

Figure 22:
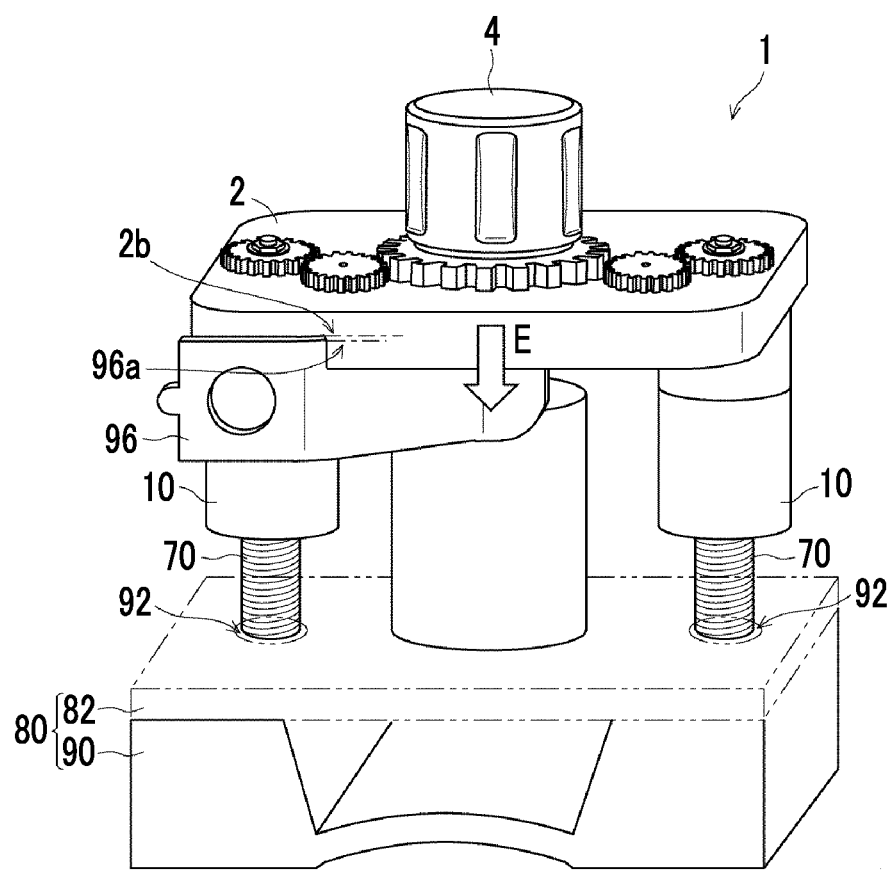
FIG. 22 is a view for describing the temporary fastening method using the temporary fastening tool according to the first embodiment.
Figure 23:
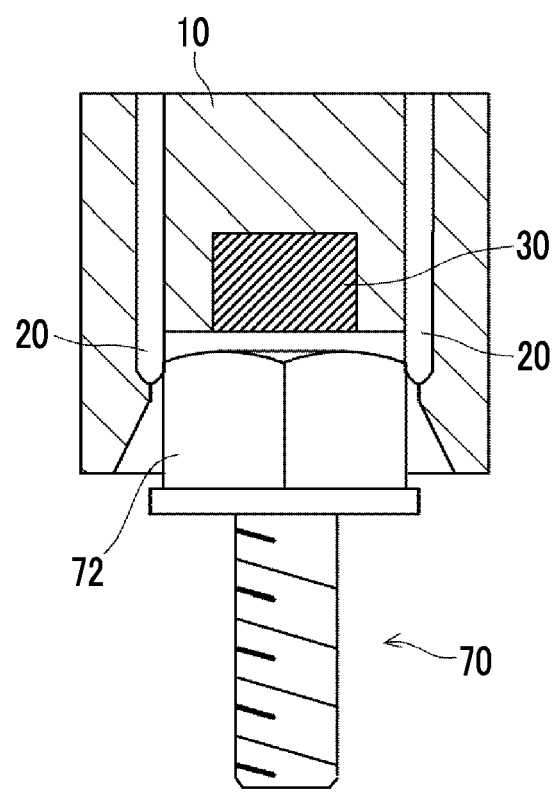
FIG. 23 is a view for describing the temporary fastening method using the temporary fastening tool according to the first embodiment.

Then, when the bolt 70 is rotated as a worker turns the grip 4 further and, as shown in FIG. 22, the upper end 96*a* of the bracket 96 butts against the groove bottom 2*b* of the positioning groove 2*a*, the temporary fastening tool 1 stops descending (step S18). Accordingly, the temporary fastening tool 1 is pointed to the workpiece 80 in the positioning groove 2*a*. Here, as shown in FIG. 6 and so on, the head section 72 of the bolt 70 is in contact with the bottom section 10*b* of the socket 10. Then, when a worker turns the grip 4 further, since the bolt 70 is rotated by the pin 20, the bolt 70 descends in the female screw section 92. However, since the temporary fastening tool 1 itself does not descend as the upper end 96*a* of the bracket 96 butts against the groove bottom 2*b* of the positioning groove 2*a*, as shown in FIG. 23, the bolt 70 is separated from the magnets 30 (step S20).

Figure 24:
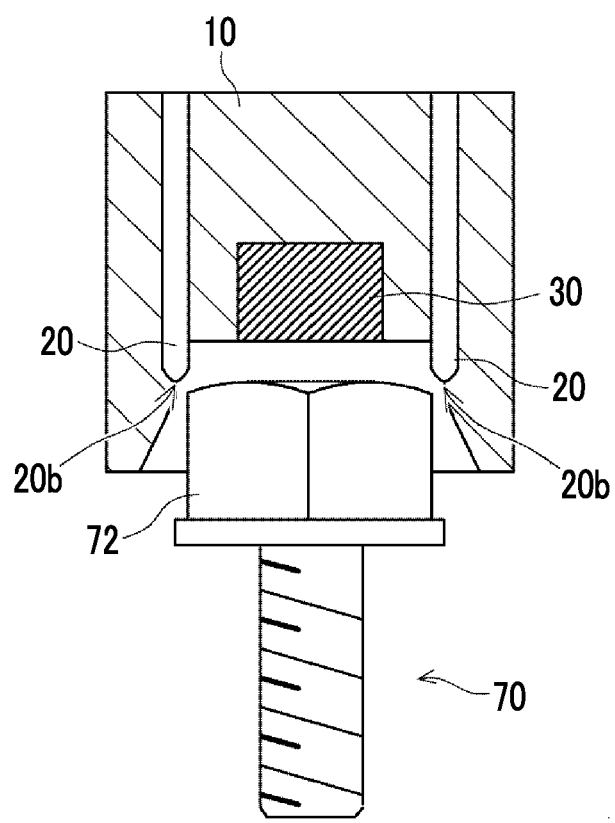
FIG. 24 is a view for describing the temporary fastening method using the temporary fastening tool according to the first embodiment.

When in this state, since the pin 20 comes in contact with the head section 72 (the corner sections 74) of the bolt 70, as a worker turns the grip 4 further, the bolt 70 is rotated and descends further in the female screw section 92. Then, when an upper end of the head section 72 descends from the tip 20*b* of the pin 20, as shown in FIG. 24, the pins 20 are not in contact with the head section 72. Accordingly, since the pins 20 cannot rotate the bolt 70 further, rotation of the bolt 70 is stopped (step S22). Accordingly, since the socket 10 idles, a burden on a worker turning the grip 4 is reduced. Accordingly, the worker can recognize that the temporary fastening is terminated. Further, since the pins 20 are removed from the bolt 70 when the bolt 70 is tightened to a required tightening amount, excessive fastening of the bolt 70 can be prevented.

Here, the projection allowance Dp (FIG. 10) of the pin 20 will be described. When the projection allowance Dp of the pin 20 is short, in the temporary fastening method shown in FIG. 19, the bolt 70 does not descend in the female screw section 92 too much, and the pins 20 are separated from head section 72 (S22). Accordingly, in this case, a screwing amount of the bolt 70, i.e., a tightening amount is reduced. Meanwhile, when the projection allowance Dp of the pin 20 is large, after the bolt 70 descends deeply into the female screw section 92, the pin 20 is separated from the head section 72 (S22). Accordingly, in this case, a screwing amount of the bolt 70, i.e., a tightening amount is increased. Accordingly, the tightening amount of the bolt 70 during the temporary fastening can be adjusted by adjusting the projection allowance Dp.

In addition, when the magnetic force of the magnet 30 is strong, in FIG. 14C, even when the head section 72 of the bolt 70 is disposed at a position far from the magnet 30 (the bottom section 10*b*), the bolt 70 is rotated such that the corner sections 74 avoid the pins 20. Accordingly, in this case, even when the projection allowance Dp of the pin 20 is large, the head section 72 of the bolt 70 does not interfere with the pins 20. Meanwhile, when the magnetic force of the magnet 30 is weak, in FIG. 14C, if the head section 72 of the bolt 70 does not approach the magnets 30 (the bottom section 10*b*), the bolt 70 is not rotated such that the corner sections 74 avoid the pins 20. Accordingly, in this case, since the head section 72 of the bolt 70 avoids interference with the pins 20, the projection allowance Dp of the pin 20 needs to be reduced. Accordingly, the projection allowance Dp of the pin 20 needs to be adjusted according to the magnetic force of the magnet 30.

Comparative Example

Figure 25:
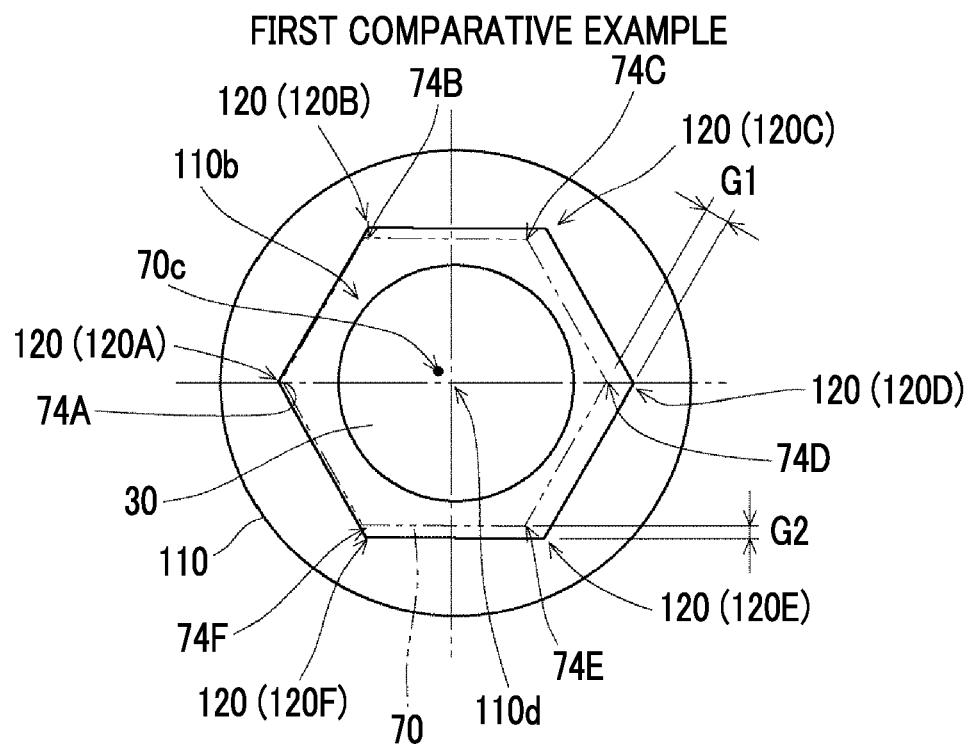
FIG. 25 is a view for describing a first comparative example.

Next, a comparative example will be described. FIG. 25 is a view for describing a first comparative example. A socket 110 according to the first comparative example is a hexagonal socket, an inner surface of which has a hexagonal shape. Further, one magnet 30 is installed at a center of a bottom section 110b of the socket 110. A size of a hexagonal shape of an inner surface of the socket 110 is slightly larger than that of a hexagonal shape of the head section 72 of the bolt 70. In addition, angles of the hexagonal shape of the inner surface of the socket 110 form engaging sections 120 (120A to 120F). When the bolt 70 is inserted into the socket 110, the corner sections 74A to 74F of the bolt 70 are engaged with the engaging sections 120A to 120F, respectively. Then, as the socket 110 is rotated in this state, the bolt 70 is rotated.

If such a socket 110 is employed, when the bolt 70 is inserted into the socket 110, the corner sections 74 of the bolt 70 may interfere with the socket 110. In addition, even when the bolt 70 is inserted into the socket 110, when there is one magnet 30, a central axis 110d of the socket 110 may be deviated from the central axis 70c of the bolt 70. In an example shown in FIG. 25, a gap G1 between the engaging section 120D and the corner section 74D is larger than a gap G2 between the engaging section 120E and the corner section 74E. When the socket 110 is rotated in this state, the corner section 74D and the corner section 74E do not engage with the engaging section 120D and the engaging section 120E, and the bolt 70 is rotated. Accordingly, the bolt 70 swings and rotates without rotating around the central axis 10d of the socket 110. In other words, when the bolt 70 is rotated, the central axis 70c of the bolt 70 does not always coincide with the central axis 10d of the socket 10, and describes a circle around the central axis 70c of the socket 10. In this case, a burden that is received by a worker may be increased during the temporary fastening.

On the other hand, the temporary fastening tool 1 according to the first embodiment is configured such that deviation between the central axis 10d of the socket 10 and the central axis 70c of the bolt 70 is inhibited when the bolt 70 is inserted into the socket 10. Accordingly, the bolt 70 can rotate around the central axis 10d of the socket 10. Further, since the socket 10 according to the first embodiment is formed in a cylindrical shape, interference of the corner sections 74 of the bolt 70 with the socket 10 when the bolt 70 is inserted into the socket 10 is inhibited. Accordingly, as the temporary fastening tool 1 according to the first embodiment is used, the temporary fastening can be efficiently performed.

Figure 26:
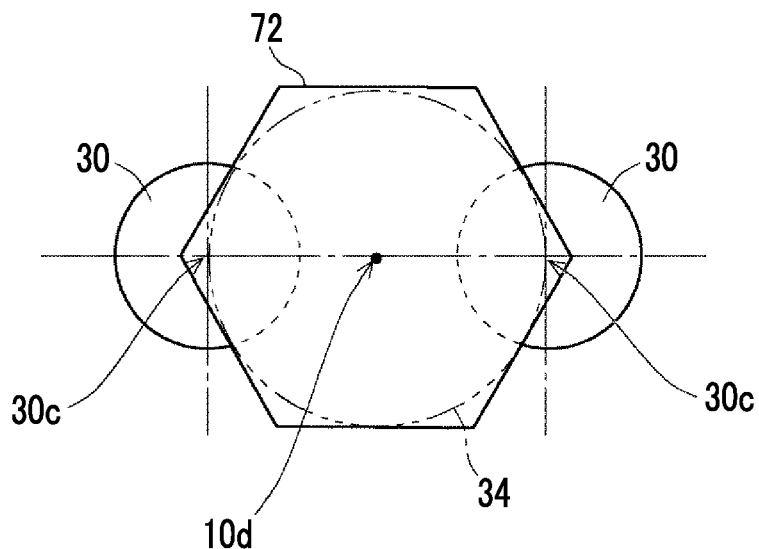
FIG. 26 is a view for describing a second comparative example.

FIG. 26 to FIG. 29 are views for describing a second comparative example. In the second comparative example, as shown in FIG. 26, the two magnets 30 are disposed such that the centers 30c of the magnets 30 are disposed on an imaginary circle 34 having a radius of a circle that inscribes the head section 72 of the bolt 70 centered on the central axis 10d of the socket 10 as a radius. The configuration is otherwise similar to the socket 10 according to the first embodiment.

Figure 27:
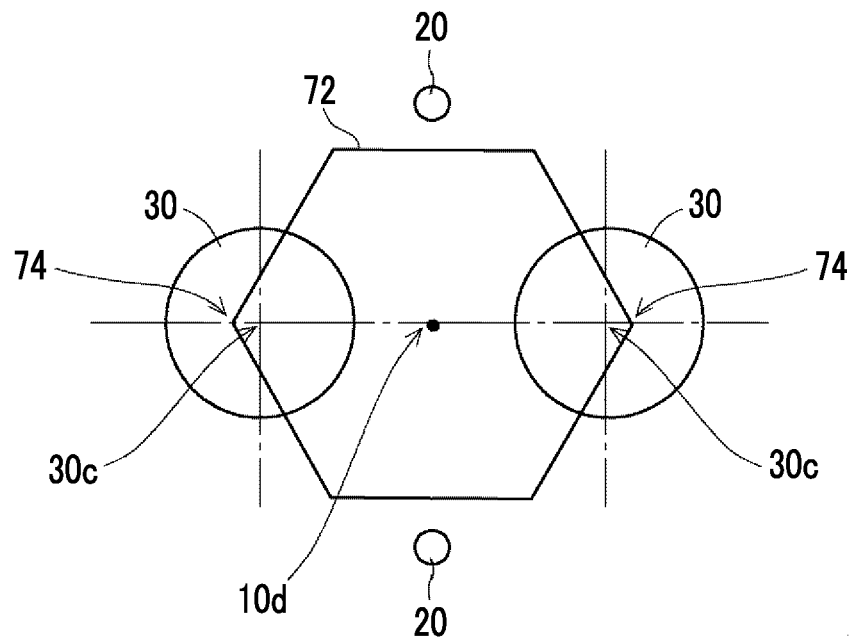
FIG. 27 is a view for describing the second comparative example.
Figure 28:
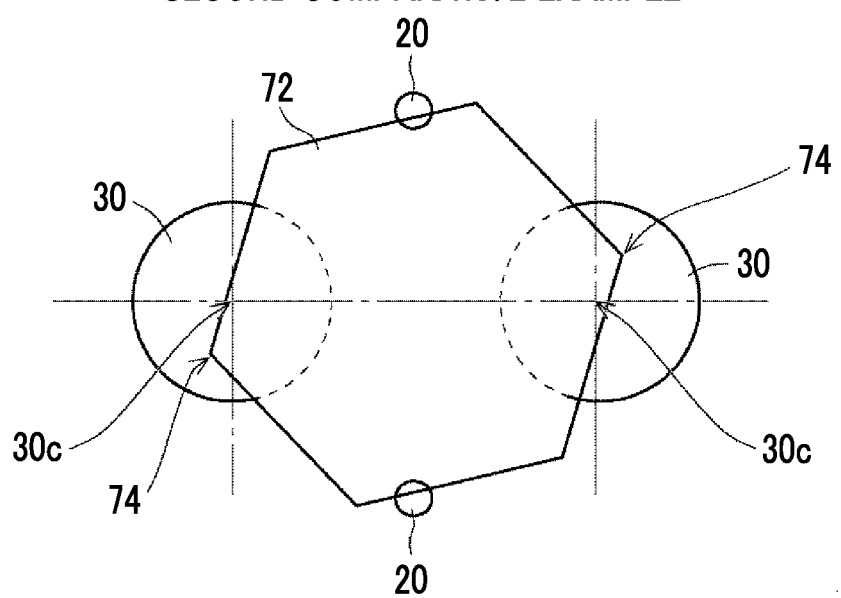
FIG. 28 is a view for describing the second comparative example.
Figure 29:
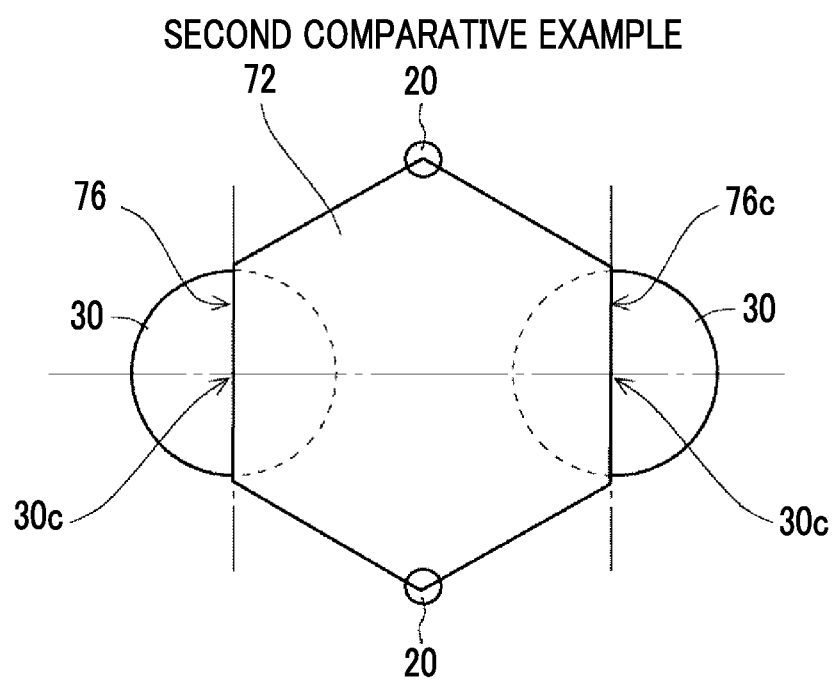
FIG. 29 is a view for describing the second comparative example.

In the configuration as in the second comparative example, as shown in FIG. 27 to FIG. 29, variation in direction of the head section 72 when the head section 72 of the bolt 70 is attracted to the magnets 30 occurs. That is, a state as shown in FIG. 27 may occur, a state as shown in FIG. 28 may occur, or a state as shown in FIG. 29 may occur.

As shown in FIG. 27, when the two opposite corner sections 74 are disposed in the vicinity of the centers 30c of the two opposite magnets 30, since this is the same as the state shown in FIG. 13, as shown in FIG. 14C, the corner sections 74 do not interfere with the pins 20. However, when the corner sections 74 are far from the center 30c of the magnet 30 as shown in FIG. 28 or when a flat section 76 of the head section 72 is disposed on the center 30c of the magnet 30 as shown in FIG. 29, the corner sections 74 may interfere with the pins 20. Accordingly, it may be difficult to insert the bolt 70 into the socket 10.

On the other hand, when the temporary fastening tool 1 according to the first embodiment inserts the bolt 70 into the socket 10 as shown in FIG. 14C, the head section 72 of the bolt 70 is rotated such that the corner sections 74 avoid the pins 20. Accordingly, interference of the corner sections 74 with the pins 20 is inhibited. Accordingly, the temporary fastening can be efficiently performed using the temporary fastening tool 1 according to the first embodiment.

Second Embodiment

Next, a second embodiment will be described. In the first embodiment, magnetic poles of the magnets 30 are not mentioned and are arbitrary. On the other hand, in the socket 10 according to the second embodiment, directions of the magnetic poles of the two magnets 30 are determined.

Figure 30:
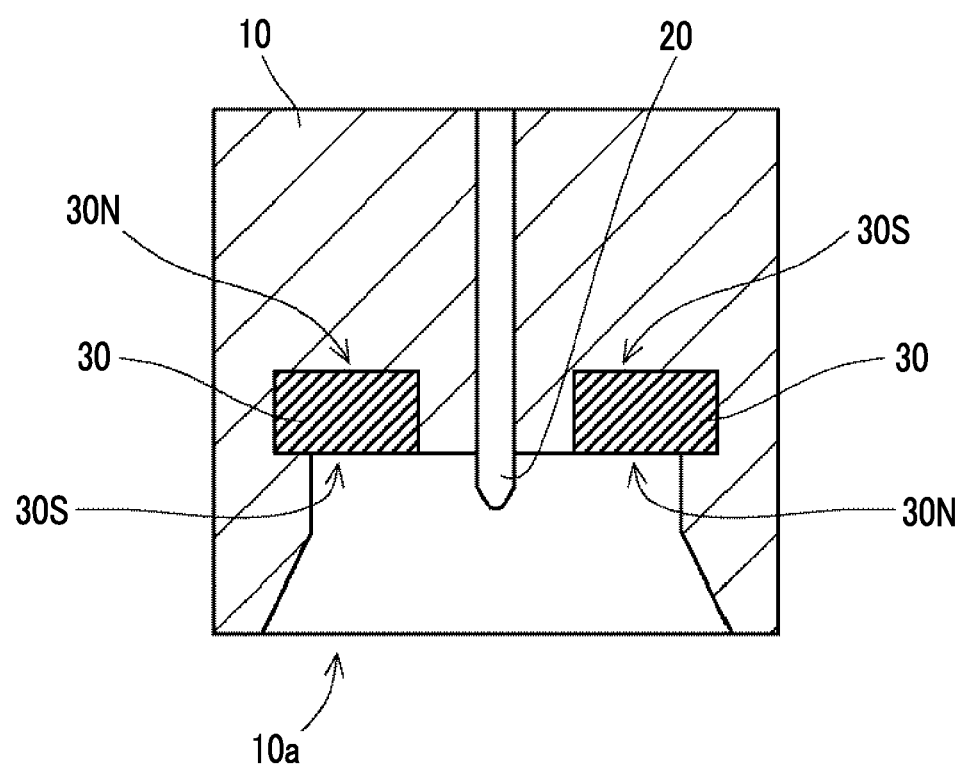
FIG. 30 is a view showing a socket according to a second embodiment.

FIG. 30 is a view showing the socket 10 according to the second embodiment. In the socket 10 according to the second embodiment, one of the magnets 30 (the magnet 30 of a left side of FIG. 30) is disposed such that an S pole surface 30S is at a lower side (a side of the opening section 10a) and an N pole surface 30N is at an upper side. Meanwhile, the other magnet 30 (the magnet 30 of a right side of FIG. 30) is disposed such that the N pole surface 30N is at the lower side (the side of the opening section 10a) and the S pole surface 30S is at the upper side. That is, in the socket 10 according to the second embodiment, the two magnets 30 are disposed such that the direction of the magnetic poles are different from each other.

FIGS. 31A to 31C are views showing a state in which the bolt 70 is inserted into the socket 10 according to the second embodiment. In the case of the state in which the bolt 70 is inserted into the socket 10 as shown in FIG. 31A, a magnetic field is generated from the N pole surface 30N to the S pole surface 30S in the bolt 70 inserted into the socket 10. Accordingly, a magnetic force on the bolt 70 inserted into the socket 10 is blocked. Accordingly, as shown in FIG. 31B, even when the bolt 70 enters a parts box in which parts such as bolts and so on are accommodated, as shown in FIG. 31C, the other parts are not attracted to the bolt 70 inserted into the socket 10.

In this way, when the socket 10 according to the second embodiment is used, only one part (the bolt 70) is attracted by the socket 10. In other words, attraction of other parts to the part such as the bolt 70 or the like inserted into the socket 10 can be inhibited. Accordingly, the socket 10 according to the second embodiment is effective when the other parts are preferably not attracted to the part such as the bolt 70 or the like inserted into the socket 10.

Third Embodiment

Figure 32:
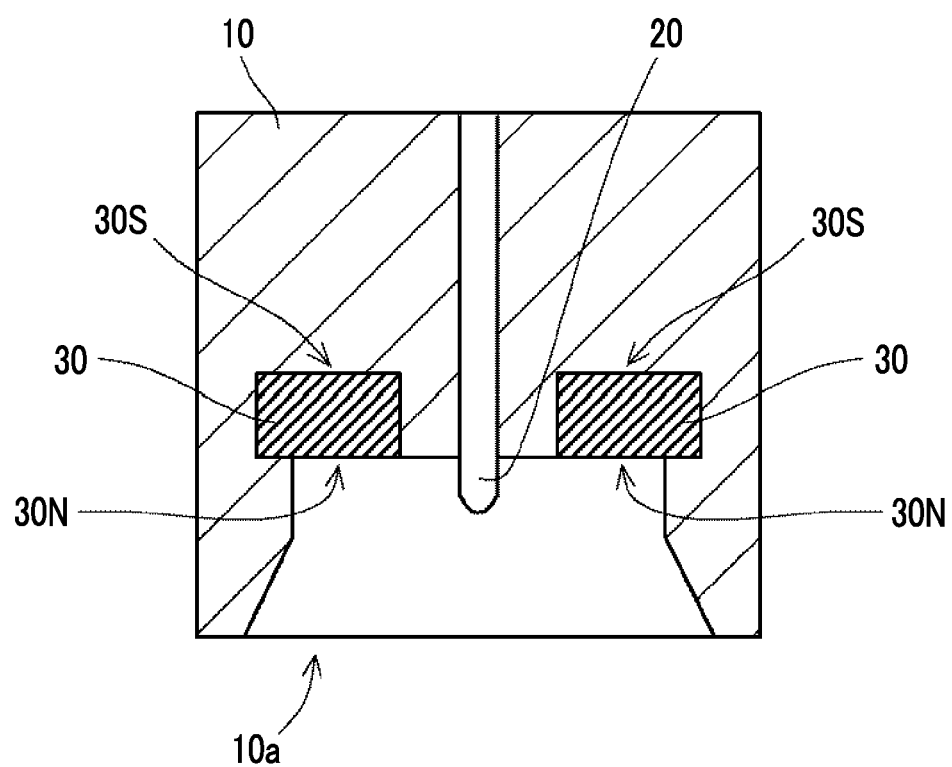
FIG. 32 is a view showing a socket according to a third embodiment.

Next, a third embodiment will be described. In the third embodiment, directions of magnetic poles of the two magnets 30 are different from the second embodiment. FIG. 32 is a view showing the socket 10 according to the third embodiment. In the socket 10 according to the third embodiment, in both of the two magnets 30, the N pole surface 30N is at a lower side (a side of the opening section 10a) and the S pole surface 30S is at an upper side. That is, in the socket 10 according to the third embodiment, the two magnets 30 are disposed such that directions of the magnetic pole are the same as each other.

FIGS. 33A to 33C are views showing a state in which the bolt 70 is inserted into the socket 10 according to the third embodiment. In the case of the state in which the bolt 70 is inserted into the socket 10 as shown in FIG. 33A, the bolt 70 inserted into the socket 10 is magnetized by the N pole surface 30N of the head section 72 side. Accordingly, a magnetic field is generated from a tip 70a of the bolt 70 inserted into the socket 10. Accordingly, when the bolt 70 enters a parts box in which parts such as bolts or the like are accommodated as shown in FIG. 33B, as shown in FIG. 33C, another part 70X may be attracted to the bolt 70 inserted into the socket 10.

In this way, when the socket 10 according to the third embodiment is used, in addition to the bolt 70 inserted into the socket 10, another part is also attracted by the socket 10. Accordingly, the socket 10 according to the third embodiment is effective when it is desirable that another part be attracted to the part such as the bolt 70 or the like inserted into the socket 10. Further, in the above-mentioned example, while the N pole surfaces 30N of the two magnets 30 are directed toward the opening section 10a of the socket 10, the S pole surfaces 30S of the two magnets 30 may be directed toward the opening section 10a of the socket 10.

FIGS. 34A to 34C are views showing an application example of the socket 10 according to the third embodiment. First, the socket 10 approaches the bolt 70 as shown in FIG. 34A, and the bolt 70 is attracted to the magnet 30. Accordingly, the bolt 70 is inserted into the socket 10. Next, as shown in FIG. 34B, when the bolt 70 inserted into the socket 10 approaches a washer 98, as shown in FIG. 34C, the washer 98 is attracted to the magnetized bolt 70. Accordingly, the washer 98 is attached to a lower side of the head section 72 of the bolt 70. Accordingly, a temporary fastening process of the bolt 70 is more efficiently performed.

Modified Example

Further, the present disclosure is not limited to the embodiment and may be appropriately modified without departing from the spirit of the present disclosure. For example, while the temporary fastening tool 1 according to the above-mentioned embodiment includes the two sockets 10, the number of the sockets 10 is not limited to two. The number of the sockets 10 may be one or may be three or more. Further, in the case of a multi-axis temporary fastening tool having a large number of sockets 10, since the temporary fastening needs to be performed more efficiently, the temporary fastening tool 1 according to the embodiment is effective as the number of the sockets 10 may be greater.

In addition, in the above-mentioned embodiment, while the number of pins 20 is two, the number of pins 20 is not limited to two. The number of pins 20 is plural, and can be appropriately determined according to the number of corner sections 74 of the head section 72 of the bolt 70. When the bolt 70 is a hexagonal head bolt, the number of pins 20 may be two or three.

Figure 35:
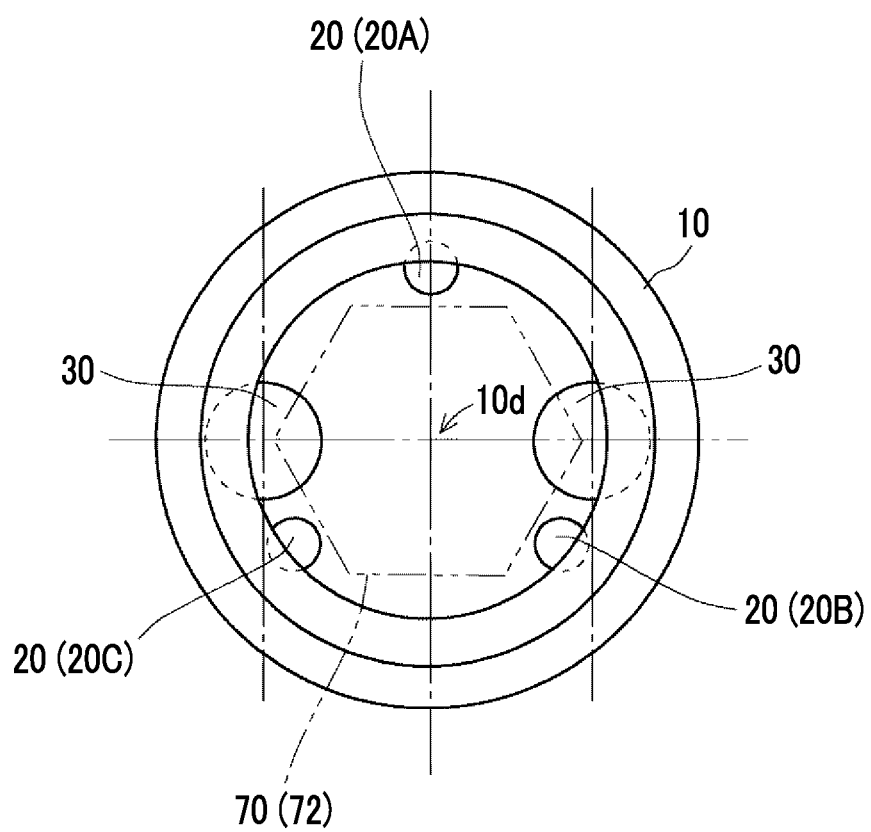
FIG. 35 is a view showing a socket when the number of pins is three.

FIG. 35 is a view showing the socket 10 when the number of pins 20 is three. FIG. 35 is a view showing the socket 10 from the side of the opening section 10a. The three pins 20 (20A to 20C) are disposed at apexes of an equilateral triangular shape about the central axis 10d of the socket 10. Further, also in this case, the two magnets 30 are disposed at positions that do not overlap the three pins 20. In other words, also in this case, when a circle centered on the central axis 10d of the socket 10 is assumed, the phases of the magnets 30 are not equal to the phases of the pins 20.

In an example shown in FIG. 35, when a phase of the pin 20A of an upper side is 0° and a clockwise direction is positive, a phase of the pin 20B of a right lower side is 120°, and a phase of the pin 20C of a left lower side is 240°. In addition, a phase of the magnet 30 of a right side is 90°, and a phase of the magnet 30 of a left side is 270°. Accordingly, even in this case, when the bolt 70 is inserted into the socket 10, interference of the corner sections 74 of the head section 72 of the bolt 70 with the pins 20 can be inhibited.

In addition, in the above-mentioned embodiment, while the section to be screwed is the female screw section 92 and the screwing member is the bolt, these are not limited thereto. The section to be screwed may be a bolt (for example, a stud bolt), and the screwing member may be a nut. Further, when the screwing member is a nut, an outer surface of the nut corresponds to an outer circumferential section.

In addition, while the magnetic forces of the two magnets 30 are preferably equal to each other, the magnetic forces may not be strictly equal to each other. When the magnetic forces of the two magnets 30 are different from each other, a distance between the magnet 30 having a larger magnetic force and the central axis 10d of the socket 10 may be larger than a distance between the magnet 30 having a smaller magnetic force and the central axis 10d of the socket 10. Accordingly, even when the magnetic forces of the two magnets 30 are different from each other, separation of the central axis 70c of the bolt 70 from the central axis 10d of the socket 10 when the bolt 70 is inserted into the socket 10 is inhibited. However, when the magnetic forces of the two magnets 30 are equal to each other, since the two magnets 30 are disposed at positions symmetrical with respect to the central axis 10d of the socket 10, the socket 10 can be easily manufactured.

In addition, in the above-mentioned embodiments, while the positioning groove 2a with which the bracket 96 is engaged is formed in the tool main body 2, there is no limitation to the above-mentioned configuration. When there are other members that may be a reference for positioning in the workpiece 80, any positioning member that engages with the member may be provided in the tool main body 2.

What is claimed is:

1. A temporary fastening tool configured to temporarily fasten a screwing member to a section to be screwed of a workpiece, the temporary fastening tool comprising:
a tool main body;
a grip installed on the tool main body;
a socket rotatably supported by the tool main body and configured such that the screwing member is inserted into the socket, the socket having a cylindrical shape;
a transmission mechanism configured to transmit a rotation driving force input to the grip to the socket;
a plurality of pins disposed in an inner surface section of the socket to extend from a bottom section of the socket toward an opening section of the socket; and
two magnets installed on the bottom section of the socket,
wherein, at least portions of side surfaces of the pins protrude from the inner surface section of the socket toward a central axis of the socket, when the socket is rotated in a state in which the screwing member is inserted into the socket, the portions of the pins collide against corner sections of the screwing member and then the screwing member is rotated to be screwed into the section to be screwed, the magnets are disposed such that centers of the magnets are disposed outside of an imaginary circle having a radius of a circle that circumscribes an outer circumferential section of the screwing member that includes the corner sections, a center of the circle being on the central axis of the socket, and the magnets are disposed at positions that do not overlap the pins when the socket is seen from a side of the opening section.

2. The temporary fastening tool according to claim 1, wherein the two magnets are disposed such that directions of magnetic poles of the two magnets are different from each other.

3. The temporary fastening tool according to claim 1, wherein the two magnets are disposed such that directions of magnetic poles of the two magnets are the same as each other.

4. The temporary fastening tool according to claim 1, wherein a length from the bottom section of the socket to a tip of the pin is determined based on a tightening amount of the screwing member required during temporary fastening.

5. The temporary fastening tool according to claim 1, wherein, in a vicinity of the opening section of the socket, an inner diameter of the socket increases toward the opening section.

6. The temporary fastening tool according to claim 1, wherein a tip of the pin has a tapered shape.

7. The temporary fastening tool according to claim 1, wherein the two magnets are disposed at positions symmetrical with respect to the central axis of the socket.

8. The temporary fastening tool according to claim 7, wherein the outer circumferential section of the screwing member has a hexagonal shape, the number of the pins is two, the two pins are disposed symmetrically with respect to the central axis of the socket, and a line connecting the two magnets passing through the central axis of the socket and a line connecting the two pins passing through the central axis of the socket cross each other at 90°.

* * * * *